(12) United States Patent
De Cacqueray et al.

(10) Patent No.: US 9,081,118 B2
(45) Date of Patent: Jul. 14, 2015

(54) DEVICE AND METHOD FOR COMPUTING DEPTH VELOCITY VARIATIONS

(75) Inventors: Benoît De Cacqueray, Clamart (FR); Thomas Bianch, Massy (FR); Philippe Roux, Grenoble (FR); Michel Campillo, La Tronche (FR); Stefan Catheline, Grenoble (FR)

(73) Assignee: CGGVERITAS SERVICES SA, Massy Cedex (FR)

( * ) Notice: Subject to any disclaimer, the term of this patent is extended or adjusted under 35 U.S.C. 154(b) by 699 days.

(21) Appl. No.: 13/405,854

(22) Filed: Feb. 27, 2012

(65) Prior Publication Data

US 2013/0131990 A1 May 23, 2013

Related U.S. Application Data

(60) Provisional application No. 61/561,998, filed on Nov. 21, 2011, provisional application No. 61/583,883, filed on Jan. 6, 2012, provisional application No. 61/586,339, filed on Jan. 13, 2012.

(51) Int. Cl.
*G01V 1/00* (2006.01)
*G01V 1/36* (2006.01)
*G01V 1/30* (2006.01)
(Continued)

(52) U.S. Cl.
CPC ... *G01V 1/36* (2013.01); *G01V 1/00* (2013.01); *G01V 1/28* (2013.01); *G01V 1/305* (2013.01); *G01V 1/34* (2013.01); *G01V 1/366* (2013.01); *G01V 1/375* (2013.01); *G01V 1/38* (2013.01); *G01V 2210/32* (2013.01)

(58) Field of Classification Search
CPC ..... G01V 1/36; G01V 2210/32; G01V 1/305; G01V 1/375; G01V 1/38; G01V 1/28; G01V 1/34
USPC .......................................................... 702/18
See application file for complete search history.

(56) References Cited

U.S. PATENT DOCUMENTS 4,110,729 A * 8/1978 Vreugde .......................... 367/63
6,438,069 B1 * 8/2002 Ross et al. ...................... 367/73
(Continued)

OTHER PUBLICATIONS

Wegler et al., "Fault zone monitoring with passive image interferometery", Oct. 31, 2006, p. 1031.*
(Continued)

*Primary Examiner* — John Breene
*Assistant Examiner* — Eyob Hagos
(74) *Attorney, Agent, or Firm* — Patent Portfolio Builders PLLC

(57) ABSTRACT

Method, computer device and software for calculating a corrected temporal variation $(dt_1)_{depth}$ or a corrected relative temporal variation $(dt_1/t_1)_{depth}$ of a first body wave based on a second body wave. The method includes receiving raw seismic data recorded with a receiver; calculating arrival-time variations for the first and second body waves; calculating first and second relative temporal variations for the first and second body waves; and correcting the first relative temporal variation based on the second relative temporal variation to obtain the corrected relative temporal variation or correcting the first temporal variation based on the second temporal variation to obtain the corrected temporal variation. A body wave is a wave that experiences at least one reflection before being recorded by the receiver.

25 Claims, 14 Drawing Sheets

(51) Int. Cl.
  *G01V 1/37* (2006.01)
  *G01V 1/38* (2006.01)
  *G01V 1/28* (2006.01)
  *G01V 1/34* (2006.01)

(56) References Cited

U.S. PATENT DOCUMENTS

| | | | |
|---|---|---|---|
| 6,681,887 B1 * | 1/2004 | Kragh et al. | 181/110 |
| 6,799,118 B2 | 9/2004 | MacKay | |
| 6,826,501 B1 * | 11/2004 | Carvill | 702/100 |
| 7,321,526 B2 | 1/2008 | Carvill et al. | |
| 2003/0055569 A1 * | 3/2003 | Shatilo et al. | 702/17 |
| 2007/0223308 A1 * | 9/2007 | Frivik et al. | 367/19 |
| 2007/0268780 A1 | 11/2007 | Moore | |
| 2009/0128800 A1 * | 5/2009 | Meldahl et al. | 356/28.5 |
| 2012/0035852 A1 * | 2/2012 | Edme | 702/14 |

OTHER PUBLICATIONS

C. P. Ross et al., "Inside the Cross-Equalization Black Box", The Leading Edge, Nov. 1996, pp. 1233-1240.

Scott MacKay et al., "The Impact of Water-Velocity Variations on Deepwater Seismic Data", The Leading Edge, Apr. 2003, pp. 344-350.

J. Meunier et al., "Determining Acquisition Parameters for Time Lapse Seismic Recording", EAGE 59th Conference and Technical Exhibition, Geneva Switzerland, May 26-30, 1997 Geophysical Division.

U. Wegler et al., Fast Track Paper, "Fault Zone Monitoring with Passive Image interferometry" Geophys. J. int., 2007 168, pp. 1029-1033.

* cited by examiner

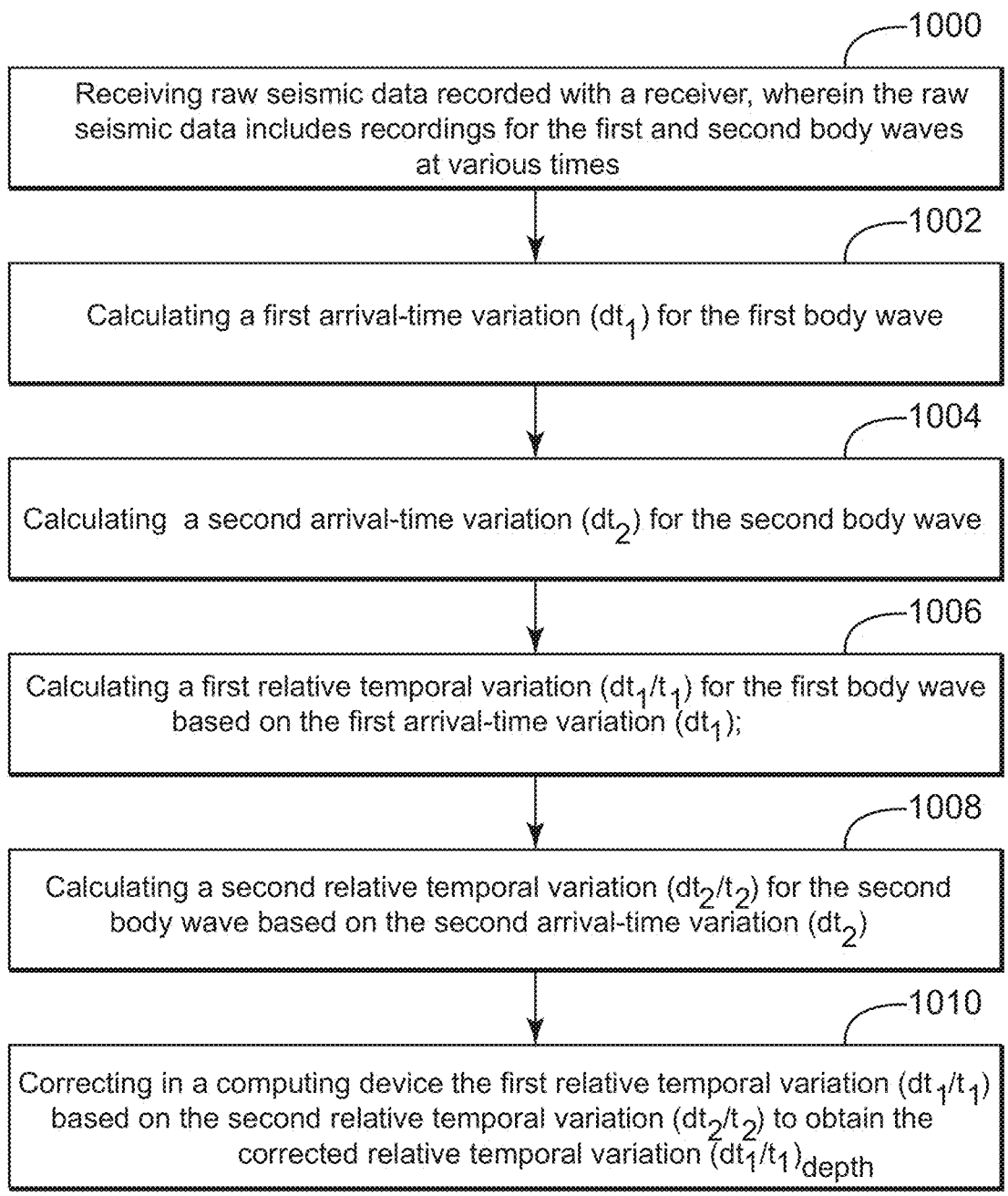

DEVICE AND METHOD FOR COMPUTING DEPTH VELOCITY VARIATIONS

CROSS REFERENCE TO RELATED APPLICATIONS

This application claims priority and benefit from Provisional Patent Application No. 61/561,998, filed Nov. 21, 2011, for "Method to compute depth velocity variations in presence of surface velocity variations," Provisional Patent Application No. 61/583,883, filed Jan. 6, 2012, for "Method to compute depth velocity variations in presence of surface velocity variations," and Provisional Patent Application No. 61/586,339, filed Jan. 13, 2012, the entire contents of which are incorporated in their entirety herein by reference.

BACKGROUND

1. Technical Field

Embodiments of the subject matter disclosed herein generally relate to methods and systems and, more particularly, to mechanisms and techniques for computing subsurface parameters variations (e.g., velocity) at desired depths.

2. Discussion of the Background

Marine seismic data acquisition and processing generate a profile (image) of the geophysical structure under the seafloor. While this profile does not provide an accurate location for oil and gas reservoirs, it suggests, to those trained in the field, the presence or absence of them. Thus, providing a high-resolution image of the subsurface is an ongoing process.

Generally, a seismic source is used to generate a seismic signal which propagates into the earth and it is at least partially reflected by various seismic reflectors in the subsurface. The reflected waves are recorded by seismic receivers. The seismic receivers may be located on the ocean bottom, close to the ocean bottom, below a surface of the water, at the surface of the water, on the surface of the earth, or in boreholes in the earth. The recorded seismic data, e.g., travel-time, may be processed to yield information relating to the location of the subsurface reflectors and the physical properties of the subsurface formations, e.g., to generate an image of the subsurface.

One problem when acquiring seismic data is that one or more portions of the medium (e.g., water) above the surveyed subsurface may have variable velocities. This depth velocity variation creates inconsistent travel-times between the seismic sources and the receivers. For example, as a result of the interaction between warm and cold currents when performing marine seismic surveying, the water velocity may vary rapidly, both temporally and spatially. Thus, the velocity variations may be large enough to have a detrimental effect on subsequent data processing. For example, an oil and gas reservoir may be monitored based on the velocity variations produced by the reservoir. If velocity variations introduced by the warm and cold currents, above the reservoir, are stronger than the velocity variations generated by the reservoir itself, the reservoir cannot be monitored or the obtained results are misleading.

Water velocity variations can be related to the water temperature, salinity and depth. As discussed above, the water velocity changes have implications for seismic processing. Water velocity differences may result in dynamic differences between data in the combined datasets, and these changes may affect the data processing, in particular, processes like multiple attenuation, stacking and 3D migration. However, other layers in the substrate may introduce similar variations. For example, for a land survey, the upper layer (weather layer) may also introduce these variations.

There are methods in seismology that allow computing of fine relative velocity variations (dv/v) in the subsurface. In these methods, correlations of noise records are used to reconstruct Green functions betweens pairs of receivers. Under certain hypotheses, it is possible to compute velocity variations for the coda of the correlated signals as described, for example, in Brenguier et al., "Towards forecasting volcanic eruptinos using seismic noise," Nature Geoscience, Volume: 1, Issue: 2, pages: 126-130, 2008.

In geophysics, ballistic paths of the reflection on the reservoir are preferably used. The arrival-time delay of the corresponding wavelet is computed. If the reservoir properties are changing (e.g., oil or $CO_2$ concentration, water injection, etc.), the velocity field is modified locally and the arrival-times of the wavelets vary. Determining the variation of the wavelet properties (e.g. arrival-times) allows reservoir parameters monitoring.

However, for this method, the waves reflected on the reservoir can be very noisy due to a weak intensity. If this is the case, the Signal-to-Noise Ratio (SNR) can be insufficient for velocity variation monitoring.

The near-surface layer (i.e., the medium just below the surface) faces daily and/or seasonal variations, called spurious variations, due to changes in temperature, humidity, etc. These variations induce near-surface velocity variations (i.e., noise), which can hide the deep velocity tracked variations. If the wavelet delays induced by the near-surface are greater than the delay due to the reservoir parameters variations, it is not possible to accurately monitor the reservoir.

To improve the SNR, a non-rigid matching was proposed. Non-Rigid Matching (NRM) is a method which estimates the change in two-way time (TWT) of geological features between two seismic volumes, possibly acquired at two different times. The change in TWT may, e.g., be due to a change in velocity in the surveyed area, displacement of one or more geological features, or a change in acquisition geometry (4D "acquisition footprint"). The method, a trace-by-trace matching, operates on pairs of collocated traces from the two surveys. For each pair, a unique operator is designed to cause one trace of the pair to better match the other. A smoothness criterion is typically imposed to ensure that the operators are spatially and temporally consistent. This enhances the contrast between the seismic responses related to changes within the reservoir and the areas where changes are due to acquisition artifacts or noise.

Another method, implemented by the assignee (CGGVeritas) of this patent application, consists of burying the receivers and/or the sources. The advantages of this method are (1) a significant decrease in noise level, and (2) a protection against daily/seasonal variations because the direct reflections do not propagate through the near-surface.

Although this last method works well, there are cases where it is not sufficient, in particular, when (1) surface wave energies are too high, and (2) the ghosts (or free-surface reflections) are mixed with the useful signal. In this case, the seasonal/daily variations are present.

Regarding the velocity variations computations in the marine field, significant work has been performed to remove the water-layer velocity variations between two successive acquisitions on a given area, for example, "The impact of water-velocity variations on deepwater seismic data," The Leading Edge, 2003, U.S. Pat. No. 7,321,526, U.S. Pat. No. 6,799,118.

U.S. Patent Publication No. 2007/0268780 discloses a method for removing move-out computation uncertainties.

This method uses a collection of traces with similar offset, azimuth and common-depth-point (CDP).

However, all these methods consider only the water-layer velocity variations' contribution removal. In other words, the existing methods do not consider the contribution removal of other layers, above the targeted depth but below the water-layer. Further, some of the existing methods describe an indirect delay computation or indirect velocity determination for compensating the spurious variations. However, this computation requires first a move-out step. The methods also assume a model (water-bottom depth, water-layer and earth velocity model). The methods further assume slow variations of the water-layer, or use only the water-bottom reflection to correct the computation, and the methods do not take advantage of source and/or receiver arrays. The slowness is not used to compute the incidence angles, and the methods do not consider the case where it is not possible to recover the incidence angles.

A method used in 4D land acquisition, the "cross equalization" technique, is described in, e.g., Ross et al. "*Inside the cross-equalisation black box*," The Leading Edge, 1233-1240, 1996. Some improvements to the technique to reduce amplitude bias were introduced by Rickett and Lumley, "*A cross equalization processing flow for off-the-shelf 4D seismic data,*" 68$^{th}$ Ann. Internat. Mtg. SEG Expanded Abstract, 1998.

The method considers several stacks of the same area acquired at different times. The 4D processing consists in searching time-lapse variations at depth. However, this method has problems due to the static variations occurring at the near-surface, which hide the depth variations. To correct this effect, a reference wavelet in a given window is chosen at a first acquisition (signal s1). For a second acquisition, a control wavelet is chosen in the same window (signal s2). The algorithm computes an operator A so that:

$$As_2 - s_1 \approx 0.$$

The operator A can be computed in the time or in the frequency domain. In the frequency domain, the following relation is obtained:

$$A(\omega)s_2(\omega) - s_1(\omega) \approx 0.$$

The operator A is supposed to contain the near-surface variations between the times of the two acquisitions. By applying operator A to the whole trace, the algorithm is able to compensate the near-surface variations' effect at depth.

This operation is performed after stack, and thus, it suffers from the approximation due to the normal move-out (NMO) operation. Another drawback is that the same operator A applies for all the traces having the same common mid-point but with different source and receiver points. This last issue is addressed by Meunier et al. "*Determining acquisition parameters time-lapse seismic recording,*" 59th EAGE conference and Exhibition, 1997. In the method proposed by Meunier, the cross-equalization is applied before NMO, between each source-receiver pair, leading to a surface-consistent correction.

To summarize the deficiencies of the existing methods, it is noted that in the conventional 4D exploration, the time window used to compute the "cross-equalization" correction may contain several mixed wave arrivals with different time-evolving variation; using buried sources is limited by their low power so that the body wave reflected off the reservoir interface (hereafter called useful reflection) suffers from a low SNR, which fails to provide an efficient tracking of velocity variations; and the "cross-equalization" correction is performed after NMO correction and requires a reliable velocity model to track fine velocity variations.

Accordingly, it would be desirable to provide systems and methods that avoid the afore-described problems and drawbacks.

SUMMARY

According to one exemplary embodiment, there is a method for calculating a corrected temporal variation $(dt_1)_{depth}$ or a corrected relative temporal variation $(dt_1/t_1)_{depth}$ of a first body wave based on a second body wave. The method includes a step of receiving raw seismic data recorded with a receiver, wherein the raw seismic data includes recordings for the first and second body waves at various times; a step of calculating a first arrival-time variation $(dt_1)$ for the first body wave; a step of calculating a second arrival-time variation $(dt_2)$ for the second body wave; a step of calculating a first relative temporal variation $(dt_1/t_1)$ for the first body wave based on the first arrival-time variation $(dt_1)$; a step of calculating a second temporal variation $(dt_2)$ or a relative temporal variation $(dt_2/t_2)$ for the second body wave based on the second arrival-time variation $(dt_2)$; and a step of correcting with a computing device the first relative temporal variation $(dt_1/t_1)$ based on the second relative temporal variation $(dt_2/t_2)$ to obtain the corrected relative temporal variation $(dt_1/t_1)_{depth}$, or correcting the first temporal variation $(dt_1)$ based on the second temporal variation $(dt_2)$ to obtain the corrected temporal variation $(dt_1)_{depth}$. A body wave is a wave that experiences at least one reflection before being recorded by the receiver.

According to another exemplary embodiment, there is a method for calculating a corrected parameter variation $(dp_1)_{depth}$ or a corrected relative parameter variation $(dp_1/p_1)_{depth}$ of a first body wave based on a second body wave. The method includes a step of receiving raw seismic data recorded with a receiver, wherein the raw seismic data includes recordings for the first and second body waves at various times; a step of applying an array processing algorithm to determine first and second relative parameter variations $(dp_1/p_1)$ and $(dp_2/p_2)$ or first and second parameter variations $(dp_1)$ and $(dp_2)$; and a step of correcting the first relative parameter variation $(dp_1/p_1)$ based on the second relative parameter variation $(dp_2/p_2)$ to obtain the corrected relative parameter variation $(dp_1/p_1)_{depth}$, or correcting the first parameter variation $(dp_1)$ based on the second parameter variation $(dp_2)$ to obtain the corrected parameter variation $(dp_1)_{depth}$. A body wave is a wave that experiences at least one reflection before being recorded by the receiver.

According to still another exemplary embodiment, there is a computing device for calculating a corrected temporal variation $(dt_1)_{depth}$ or a corrected relative temporal variation $(dt_1/t_1)_{depth}$ of a first body wave (26) based on a second body wave. The computing device includes an interface configured to receive raw seismic data recorded with a receiver, wherein the raw seismic data includes recordings for the first and second body waves at various times; and a processor connected to the interface. The processor is configured to calculate a first arrival-time variation $(dt_1)$ for the first body wave, calculate a second arrival-time variation $(dt_2)$ for the second body wave, calculate a first relative temporal variation $(dt_1/t_1)$ for the first body wave based on the first arrival-time variation $(dt_1)$, calculate a second relative temporal variation $(dt_2/t_2)$ for the second body wave based on the second arrival-time variation $(dt_2)$, and correct the first relative temporal variation $(dt_1/t_1)$ based on the second relative temporal variation $(dt_2/t_2)$ to obtain the corrected relative temporal variation $(dt_1/t_1)_{depth}$, or correct the first temporal variation $(dt_1)$ based on the second temporal variation $(dt_2)$ to obtain the corrected temporal variation $(dt_1)_{depth}$. A body wave is a wave that experiences at least one reflection before being recorded by the receiver.

According to still another exemplary embodiment, there is a computer-readable storing medium including computer executable instructions, wherein the instructions, when executed by a processor, implement instructions for calculating a corrected temporal variation $(dt_1)_{depth}$ or a corrected relative temporal variation $(dt_1/t_1)_{depth}$ of a first body wave based on a second body wave. The instructions implement the method steps discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 10 is a flowchart of a method for correcting a relative temporal variation of a first body wave based on a second body wave according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a method of double beam forming (DBF) to separate recorded waves and to compute a correction to compensate relative parameter variations and isolate variations produced by a volume of interest in the subsurface. However, the embodiments to be discussed next are not limited to DBF, but may be used with other algorithms for separating incoming waves. Further, the embodiments discussed next equally apply to compute a correction to compensate a parameter variation not only a relative parameter variation. Furthermore, although the exemplary embodiments focus on a relative temporal variation for a given wave, they equally apply to any other relative subsurface parameter variation or to any subsurface parameter variation. In other words, the subsurface parameter may be the time, the velocity, the amplitude, the slowness, the azimuth and the exemplary embodiments may correct their variations or their relative variations at desired depths. However, for simplicity, the following exemplary embodiments mainly refer to the relative temporal variation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a novel algorithm to be discussed next corrects a parameter variation of a first wave (a desired reflection) based on a parameter variation of a second wave (an intermediate wave) to isolate variations generated by the target, e.g., monitored reservoir. In other words, the wave of interest is affected by parameter variations from a target that is desired to be monitored, but also from a layer above the target. The parameter variation introduced by the layer above the target may be considered noise that needs to be estimated and removed. Thus, a second wave that travels through the layer above the target but not through the target is used to evaluate and compensate the noise.

Figure 1:
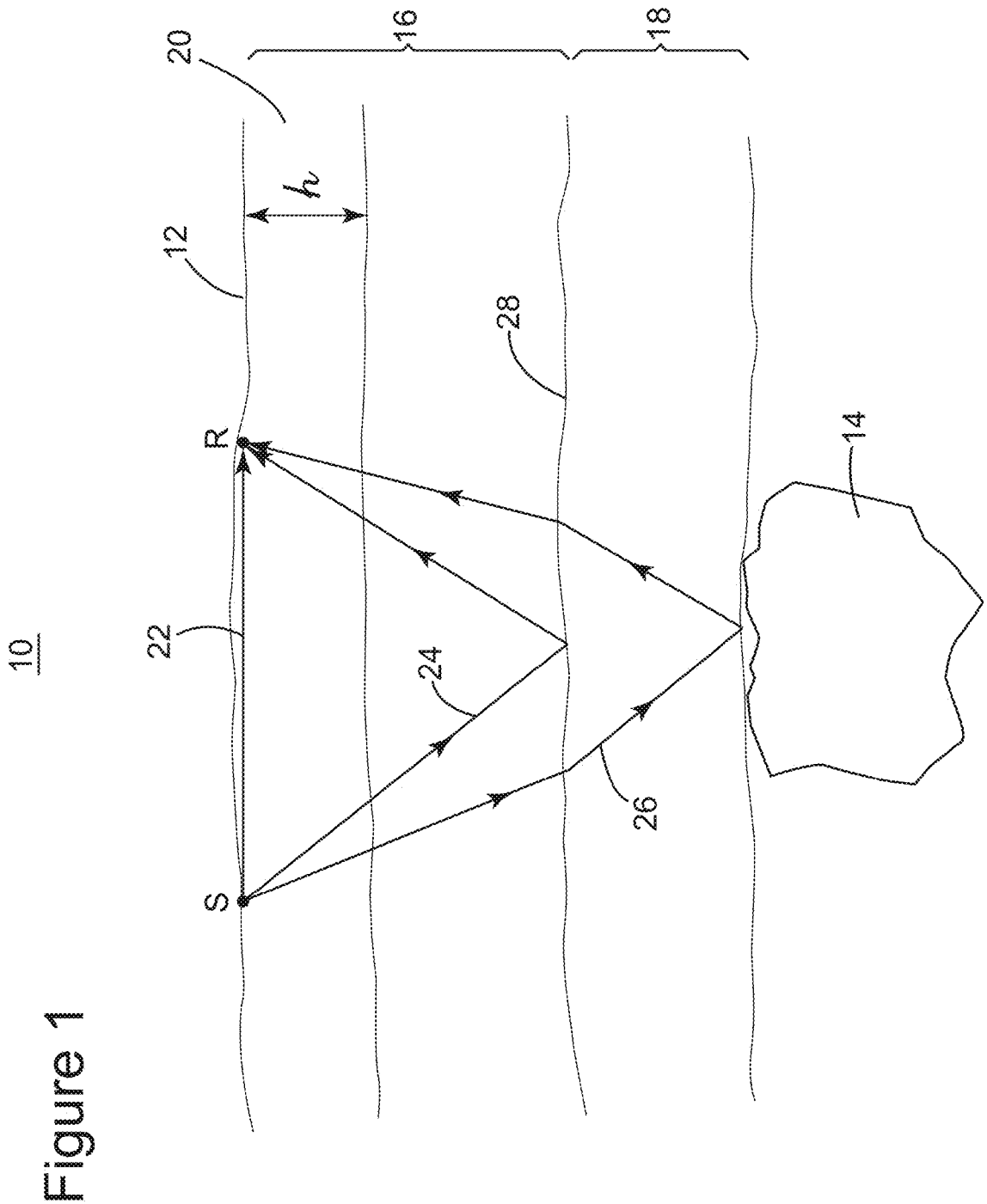
FIG. 1 is a schematic diagram of a source that generates body waves and surface waves according to an exemplary embodiment.

It is noted that a simplified seismic survey 10 is illustrated in FIG. 1 and includes a source S and a receiver R provided on the Earth's surface 12. The target reservoir 14 is separated from the surface 12 by a low velocity layer 16 and a high velocity layer 18. A layer 20 having a depth h, less than a depth of the low velocity layer 16, may be responsible for velocity variations (noise) that may mask the velocity variations generated by the target 14.

The layer 20 is traditionally referred to as a weather layer and this layer is impacted by spurious variations that need to be removed from the recorded waves. The variations are spurious in the weather layer 20 because there are many parameters that may impact this layer, e.g., daily and/or seasonal variations of temperature, humidity, pH, etc.

Thus, the seismic receiver R records waves affected by the variations produced by the target 14 and also by the weather layer 20 (or other layers situated between the target and the receiver). The intermediate wave can be a surface wave 22 (i.e., a wave that propagates directly from the source S to the receiver R with no reflections) or a body wave (24 or 26) reflecting in the medium below the receiver R. One example is a reflecting wave 24 that reflects at an interface 28 between the low velocity layer 16 and the high velocity layer 18, and another example of a body wave is a reflecting wave 26 that reflects from the target 14. The intermediate wave needs to be impacted by the velocity variations that are intended to be estimated (produced by layer 20) and removed from the seismic data recorded by the receiver R.

If the SNR is insufficient for a single source and a single receiver, the algorithm relies on data collected from a source and/or receiver array, where an array includes plural elements (sources or receivers). For this case, the DBF algorithm (known in the art and not described herein) allows selection of waves with regard to their source and/or receiver azimuth and/or slowness. With a source array that includes N sources and a receiver array that includes M receivers, the SNR gain may be $\sqrt{N \cdot M}$.

According to a first novel algorithm, for a given target, paths delays are computed using the arrival-time of the recorded wavelets. Wavelet arrival-time computation methods are known in the art and, thus, not repeated herein. The time arrival of a given wave is compared with a reference wavelet arrival-time. The reference wavelet may be the mean of the considered wavelet for a certain number of measures after windowing. The arrival-time may be estimated using a peak detection in the time domain or a phase difference computation in the phase domain after Fast Fourier Transform. The arrival-time may be optimized in the time domain with, for example, the gradient algorithm. The gradient algorithm minimizes the L2 norm of the difference between the current windowed wavelet shifted by the tested travel-time variation and the reference windowed wavelet.

If dt is the arrival-time variation of a wavelet arriving at time t, it can be shown (to be discussed later in more detail) that the relative temporal variations dt/t are proportional to the relative velocity variations dV/V. To validate that a surface wave or a body wave (the intermediate wave) has arrival-time variations correlated with a body wave reflected on the target (the desired reflection), a small-scale experiment was carried out as now described. It is noted that this correlation is necessary for removing the unwanted velocity variations from the desired reflection.

Figure 2:
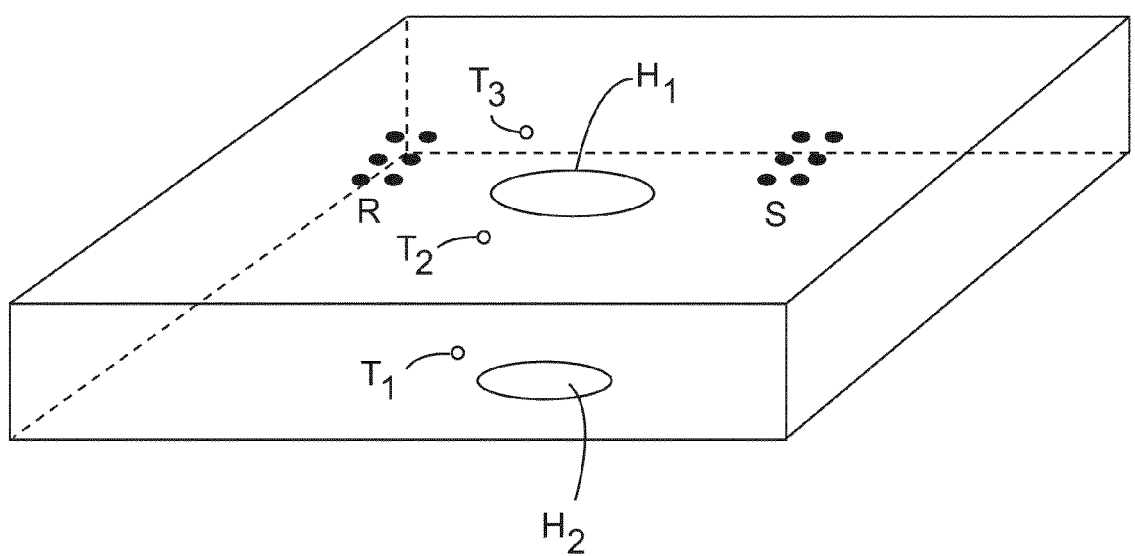
FIG. 2 is a schematic diagram of an experimental set up according to an exemplary embodiment.

The experiment uses, as shown in FIG. 2, a two-layer agar gel (similar to the layers 16 and 18 in FIG. 1) through which elastic waves propagate. The elastic waves are generated at the source S (e.g., using a piezoelectric source made of 5×5 emitters) and the reflections of the waves are recorded with the receiver R (e.g., a laser receiver array having 5×5 elements). For example, the agar gel size may be 450 mm×150 mm×90 mm. Velocity variations are generated in this experimental set up by placing a first thermal heater H1 (e.g., a resistor) in layer 20 and a second thermal heater H2 in the high velocity layer. Temperature probes T1 to T3 are placed in each layer to determine temperature variations. The temperature probes may be placed at depths of 0, 3, and 8 cm. Six parameters may be monitored, e.g., travel-time, amplitude, source and receiver slownesses, source and receiver azimuth for three surface waves and three body waves. An emission/reception sequence is repeated over a given time period, and velocity variations can be observed through wavelet arrival-time measurements. The desired reflection is considered wave 26 in FIG. 1, and the intermediate wave is one of the waves 24 or 22 in FIG. 1.

Figure 3:
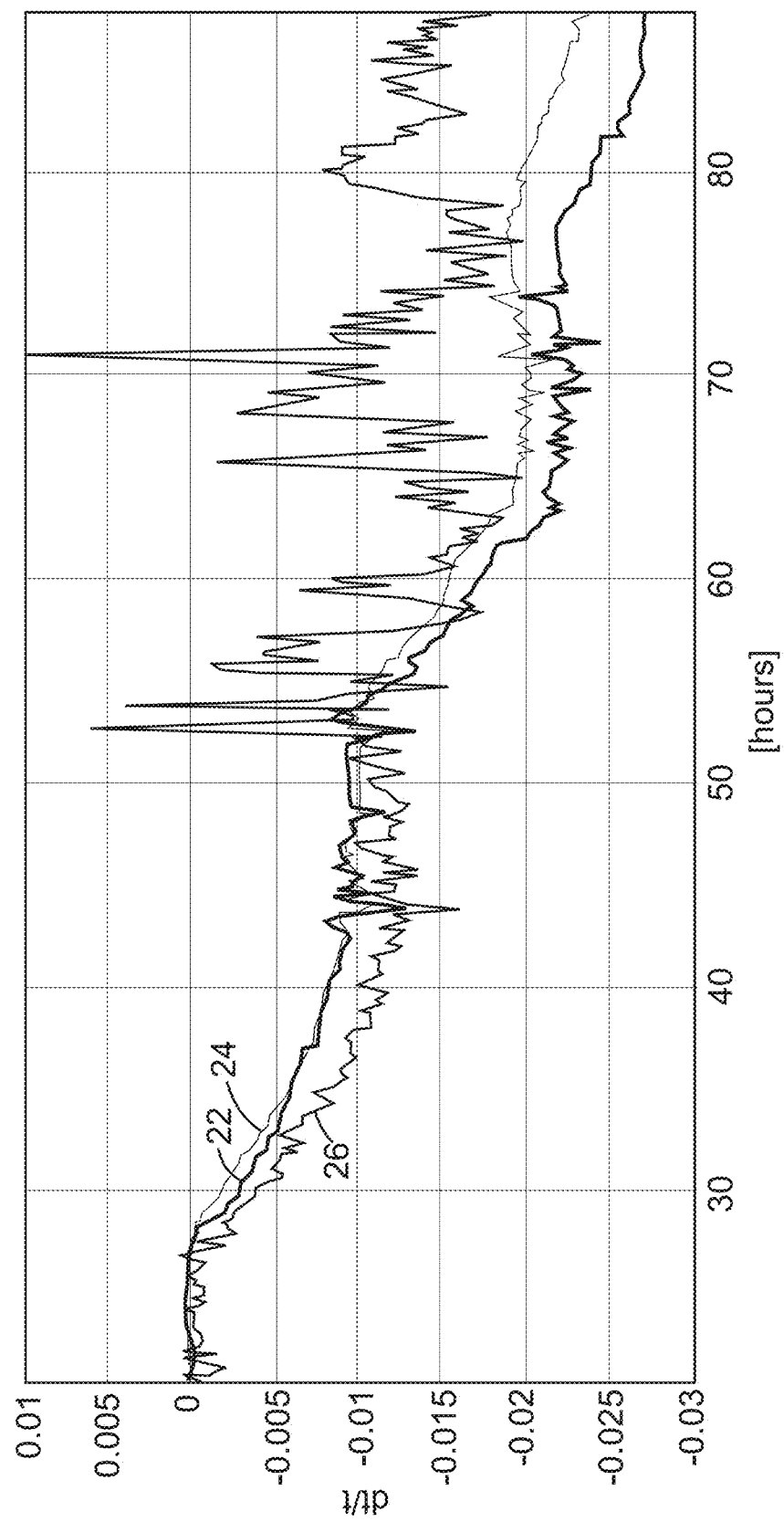
FIG. 3 is a graph of measured relative temporal variations for three different waves according to an exemplary embodiment.

FIG. 3 illustrates relative temporal variations dt/t for the three waves 22, 24 and 26 plotted as a function of time. It is noted that this experiment indicates that the relative temporal variations are correlated among themselves, which indicate that either wave 22 or wave 24 may be used to estimate the temporal variations introduced by layer 20 to remove it from wave 26. Thus, it is possible to compute depth velocity variations despite velocity variations impacting the weather layer. In fact, the novel algorithm to be discussed next is capable of removing velocity variations introduced by any layer above the target.

Returning to the assumed proportionality between the relative temporal variations dt/t and the relative velocity variations dV/V, next derived is the relation between these two quantities. It is noted that—due to spurious variations—the wave velocities vary from V to V+dV in the near-surface, between depth zero and h, in FIG. 1. This variation impacts the delay of all the waves propagating through the near-surface. Although this embodiment refers to near-surface, the novel algorithm is applicable to other layers, deeper than the near-surface. Thus, in the following, it will be shown that the relative temporal variations of wave 26 are linked to the spurious variations in the near-surface and the velocity variations introduced by layer 20 may be estimated from the relative temporal variations of another wave (e.g., wave 24 or wave 22). In the following, for simplicity in terms of the mathematical notations, wave 22 is associated with index "a," wave 24 is associated with index "b," and wave 26 is associated with index "c."

Because wave 22 is a surface wave, its path is always the same, i.e., between points S and R. Its arrival-time is given by $t_a = D/V$ if D is considered to be the distance between S and R with no reflection. Due to the velocity variation dV in the near-surface layer, the time arrival variation becomes $t_a + dt_a = D/(V+dV)$. From the above two expressions, it can be determined that at first order:

$$\frac{dt_a}{t_a} = -\frac{dV}{V}.$$

Figure 4A:
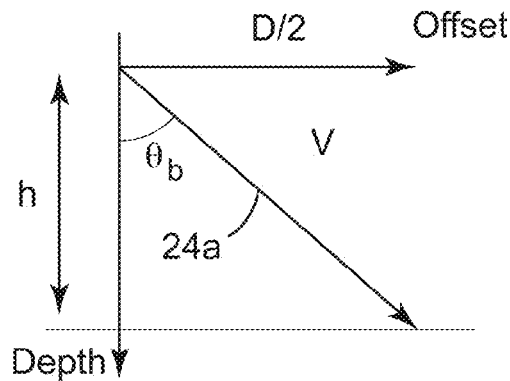
FIGS. 4A-D illustrate how a velocity variation affects a path variation according to an exemplary embodiment.
Figure 4B:
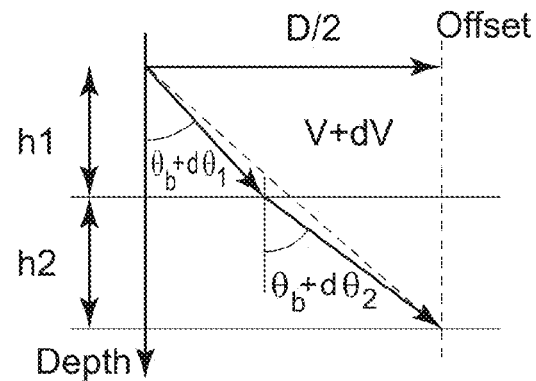
Figure 4C:
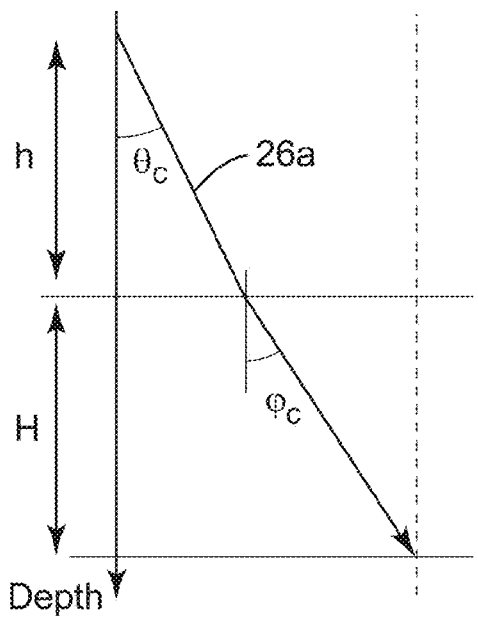
Figure 4D:
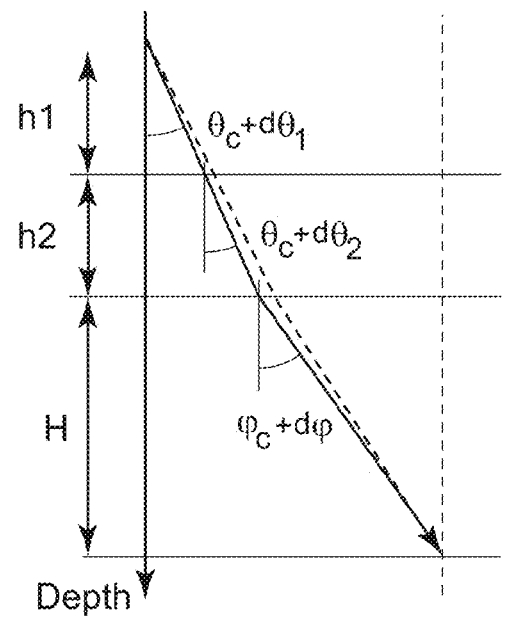

If the arrival-time variation of wave 24 is written over half offset D/2, two effects need to be taken into account: (1) the velocity variation along the path, and (2) the path variation due to the velocity variation. The path variation (the second effect) originates from the velocity variation as discussed now with regard to FIGS. 4A-D. FIG. 4A illustrates the trajectory 24a of wave 24 through a single layer, and FIG. 4B illustrates the trajectory of the same wave through two layers having a total depth equal to the layer of FIG. 4A. Similarly, FIGS. 4C and 4D show the trajectory 26a of wave 26 through two and three layers, respectively. In FIGS. 4B and D, the top layer introduced velocity variations. According to Snell-Descartes' law, the expression $\sin(\theta)/V = $ constant is true at a given interface (where θ is the incidence angle). As the velocity V varies in the top layer, so does θ, which leads to path modifications as illustrated in FIG. 4B for wave 24 and FIG. 4D for wave 26.

In the following, it is assumed that the relative temporal variation due to the second effect (i.e., path variation) is not significant compared to the first one (i.e., velocity variation). Thus, the path variation is ignored in the following. This hypothesis can be validated numerically as follows. If the dV/V variation is considered to be around +/−5% for a depth h between 5 mm up to 0, for each value of dV/V and h, the relative temporal variation due to the first and the second effect is computed.

Figure 5A:
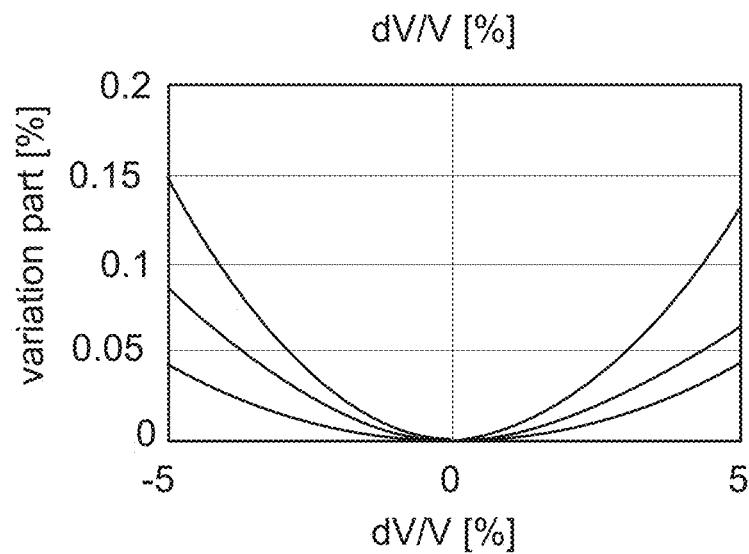
FIGS. 5A-B illustrate the effect of the path variation according to an exemplary embodiment.
Figure 5B:
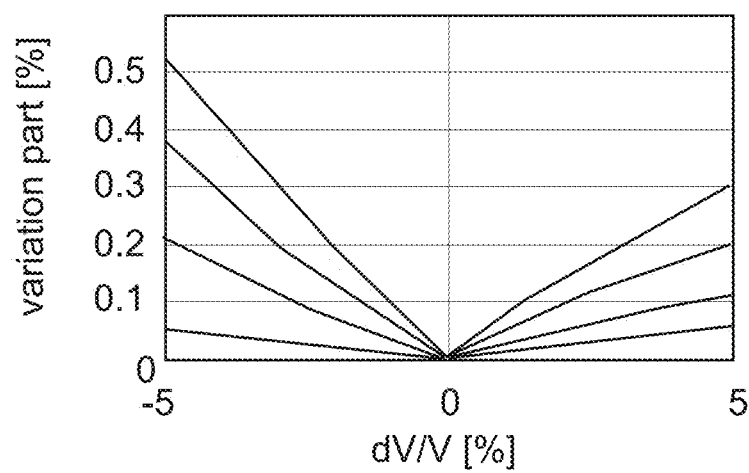

FIGS. 5A-B illustrate the results of this computation, with FIG. 5A illustrating the impact of the first effect and FIG. 5B illustrating the impact of the second effect. It is noted that the ratio between the relative temporal variation and the speed variation stays below 0.2% for wave 24 and 0.6% for wave 26. This means that for a velocity variation lower than 5%, the corresponding path variation can be neglected. Thus, for simplicity, only the velocity variation along the initial path is considered in the following. However, the algorithm may be extended to also take into account the second effect (path variation).

Figure 6:
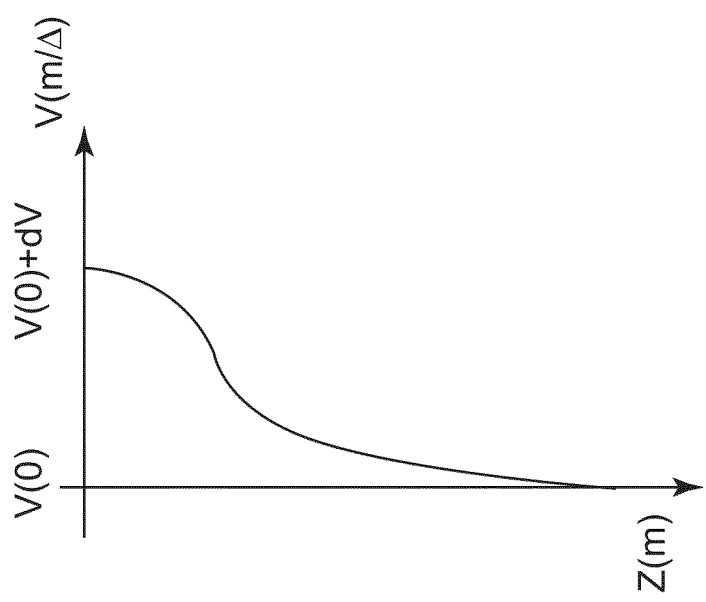
FIG. 6 is a graph of a velocity variation function of the depth according to an exemplary embodiment.

Further, it is noted that in practice, the velocity variation is not so abrupt, but rather is a smooth velocity profile with regard to a depth (z axis) as illustrated in FIG. 6A. The same assumption may be made for each sub-layer of the near-surface, when assuming a locally constant velocity. Thus, whatever the velocity profile, it is safe to assume that the propagation path is constant.

Figure 7:
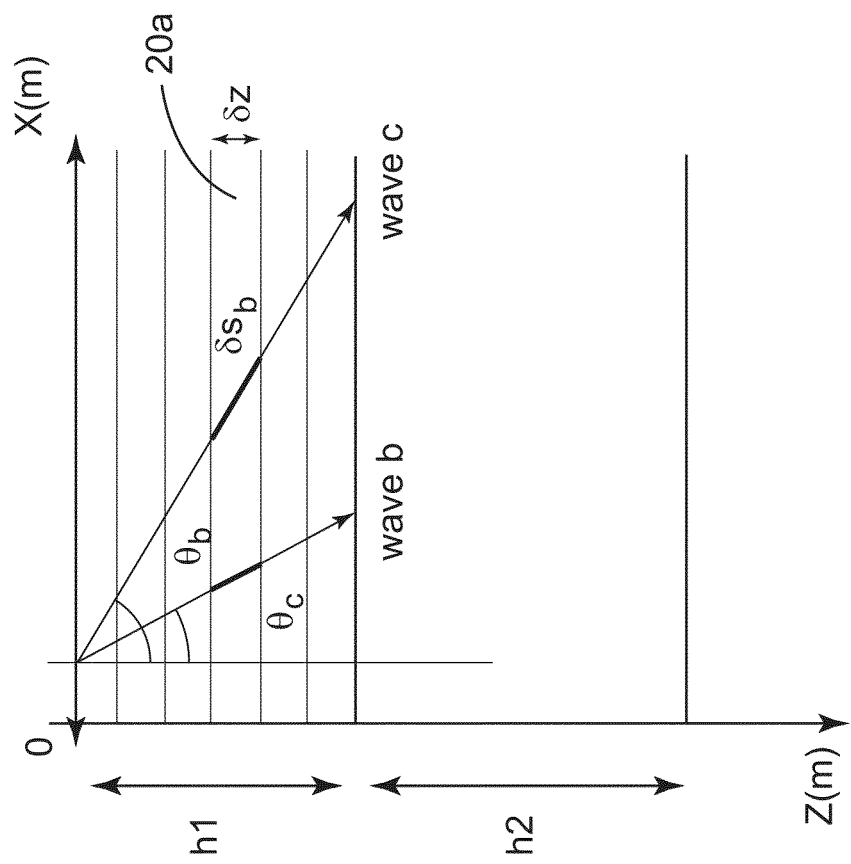
FIG. 7 is an illustration of a path change due to a velocity change in a given layer according to an exemplary embodiment.

Considering now a sub-layer 20a of the layer 20 at a depth z as illustrated in FIG. 7, a velocity of the wave varies in this layer from $V(z)$ to $V(z)+\delta V(z)$. Over this depth, the path length of wave 24 is:

$$\delta s_b = \delta z / \cos(\theta_b)$$

After the velocity change, the path time variation is:

$$\delta t_b(z) = \frac{\delta z}{\cos(\theta_b)} \cdot \frac{1}{V(z)+dV(z)} - \frac{\delta z}{\cos(\theta_b)} \cdot \frac{1}{V(z)} = -\frac{\delta z}{\cos(\theta_b)} \cdot \frac{dV(z)}{V(z)}.$$

For wave 26, the path length change is given by:

$$\delta t_c(z) = -\frac{\delta z}{\cos(\theta_c)} \cdot \frac{dV(z)}{V(z)}.$$

It is noted that:

$$\delta t_c(z) = -\frac{\cos(\theta_b)}{\cos(\theta_c)} \delta t_b(z).$$

As the path is constant, it is possible to integrate the quantity over the complete path without taking into account the angle variation. Thus, as the velocity is varying only between depth 0 and h1 with $0 < h_1 \leq h$, the following expression is obtained:

$$dt_c = \int_0^{h_1} \delta t_c(z)\delta z$$

$$= \frac{\cos(\theta_b)}{\cos(\theta_c)} \cdot \int_0^{h_1} \delta t_c(z)\delta z$$

$$= \frac{\cos(\theta_b)}{\cos(\theta_c)} dt_b.$$

This means that, for a velocity variation impacting only the near-surface, the relative temporal variation of wave 26 can be determined from the relative temporal variation of wave 24 according to:

$$\left(\frac{dt_c}{t_c}\right)_{near\ surface} = \frac{t_b}{t_c} \cdot \frac{\cos(\theta_b)}{\cos(\theta_c)} \cdot \left(\frac{dt_b}{t_b}\right).$$

Then, if wave 26 is also impacted by a velocity variation at a given depth, the relative temporal variation $$\left(\frac{dt_c}{t_c}\right)_{depth}$$

at that depth is given by:

$$\left(\frac{dt_c}{t_c}\right)_{depth} = \left(\frac{dt_c}{t_c}\right) - \left(\frac{dt_c}{t_c}\right)_{near-surface} \quad (1)$$

$$= \left(\frac{dt_c}{t_c}\right) - \frac{t_b}{t_c} \cdot \frac{\cos(\theta_b)}{\cos(\theta_c)} \cdot \left(\frac{dt_b}{t_b}\right)$$

$$= \left(\frac{dt_c}{t_c}\right) - r \cdot \left(\frac{dt_b}{t_b}\right),$$

where r is $$\frac{t_b}{t_c} \cdot \frac{\cos(\theta_b)}{\cos(\theta_c)}.$$

In other words, $dt_c/t_c$ is the total relative temporal variation due to both the near-surface layer ($(dt_c/t_c)_{near-surface}$) and the target ($(dt_c/t_c)_{depth}$). A similar relation can be derived for the temporal variation instead of the relative temporal variation:

$$(dt_c)_{depth} = dt_c - (dt_c)_{near-surface} \quad (2)$$

$$= dt_c - \frac{\cos(\theta_b)}{\cos(\theta_c)} \cdot dt_b$$

$$= dt_c - r \cdot dt_b.$$

It is noted that an equation for a subsurface parameter variation dx, where x is considered to be a generic subsurface parameter, can be derived from an equation for the corresponding relative subsurface parameter variation dx/x by multiplying the entire equation for the relative subsurface parameter variation by x.

Figure 8A:
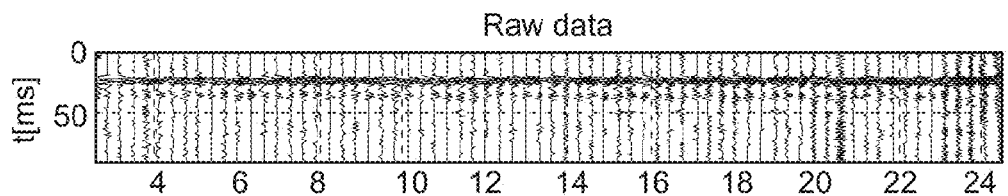
FIGS. 8A-E are graphs illustrating raw data, slowness and signals recorded for various waves according to an exemplary embodiment.
Figure 8B:
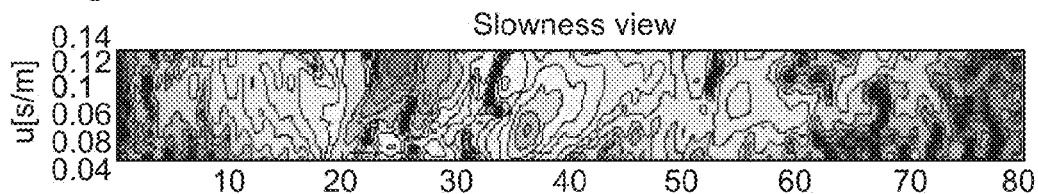

Thus, equations valid for relative parameter variations can be similarly adapted for parameter variation. For simplicity, equation (1) is used to determine the relative temporal variations for waves 22, 24 and 26 in the above-noted experiment. More specifically, the receiver records the signals coming from the source array over a 24-hour period, with a measurement taking place every 20 minutes. One point-to-point trace between the center of the source array and the center of the receiver array is illustrated in FIG. 8A. This corresponds to the raw data. The raw data is processed with the DBF algorithm to produce the slowness mapping illustrated in FIG. 8B.

Figure 8C:
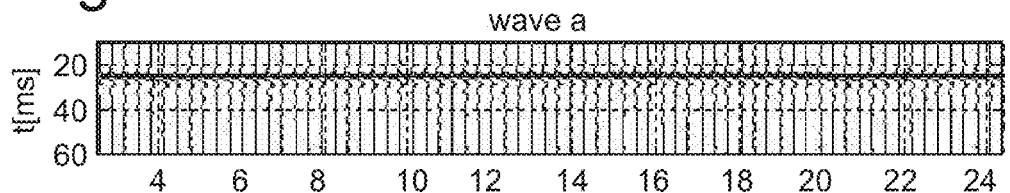
Figure 8D:
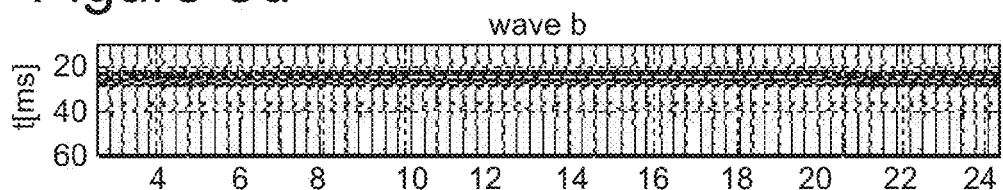
Figure 8E:
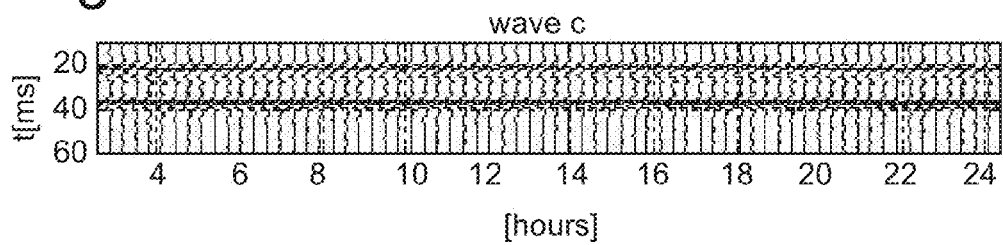

Using the DBF algorithm, three wavelets corresponding to waves 22, 24 and 26 are extracted using the slowness mapping. The wavelets are illustrated in FIGS. 8C, D and E. Using the slowness map of FIG. 8B, DBF allows recovery of the incidence angles for each wave due to the relation $u=\sin(\theta)/V$ for the body waves, knowing that $V=1/u$ for the surface wave, and u being the slowness.

Figure 9A:
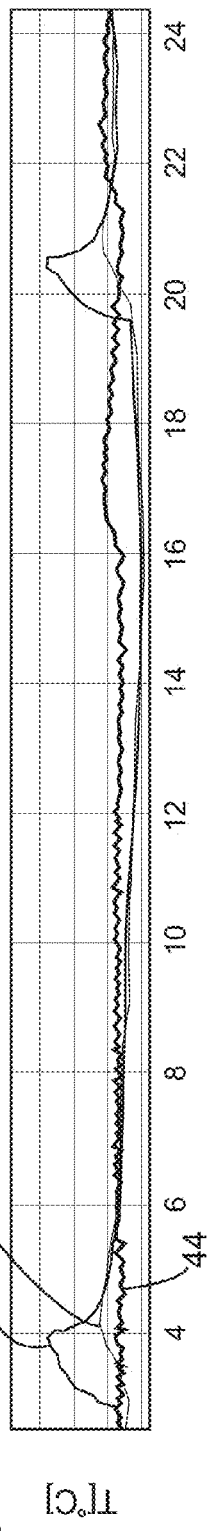
FIGS. 9A-D are graphs illustrating a temperature evolution of a medium, a timing for turning on and off heaters, and relative temporal variations for corrected and uncorrected waves according to an exemplary embodiment.
Figure 9B:
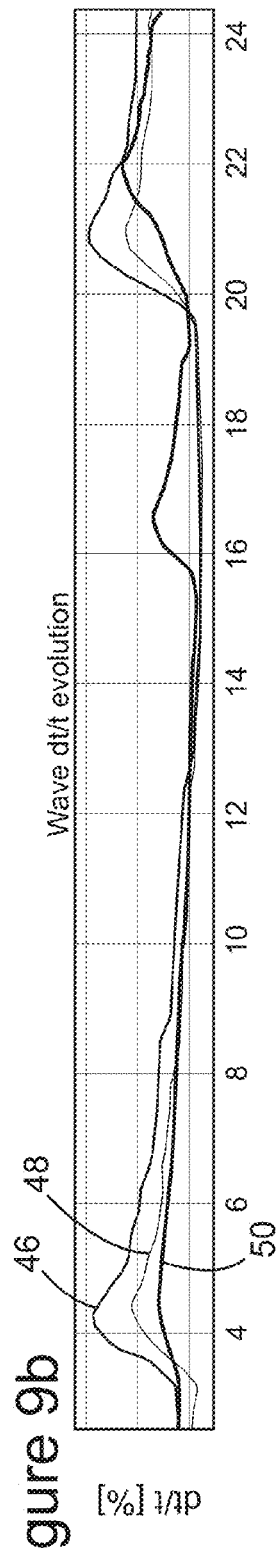
Figure 9C:
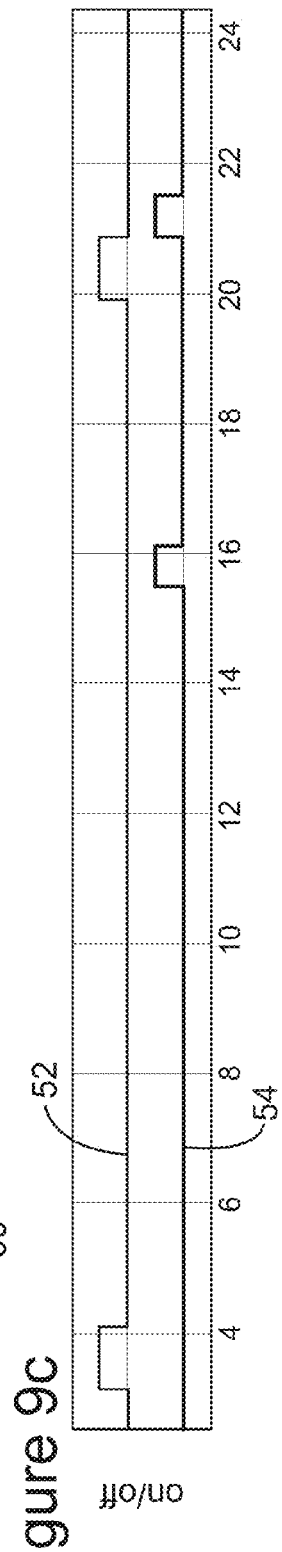
Figure 9D:
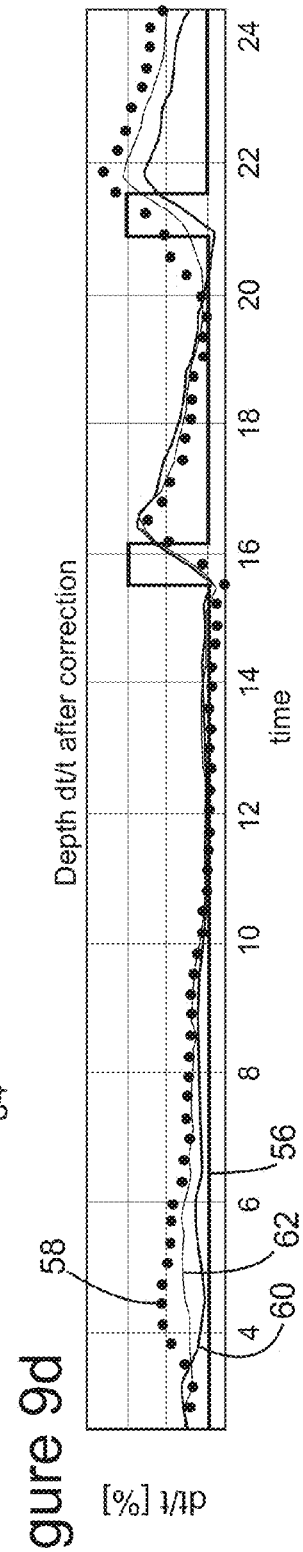

Next, the temporal variations dt, or relative temporal variations (dt/t) of the three waves are measured while activating an appropriate heater at the surface (to simulate spurious variations) and/or in depth (to simulate the desired variations produced by the target). FIG. 9A illustrates the temperature 40 of the medium at the surface, the temperature 42 at depth 3 cm and the temperature 44 at the bottom. FIG. 9B illustrates the relative temporal variations 46, 48 and 50 corresponding to waves 22, 24 and 26, respectively, and FIG. 9C illustrates the first heater activation schedule 52 and the second heater activation schedule 54. FIG. 9D illustrates the depth heater activation 56, the relative temporal variation 58 for wave 26 (which is identical to curve 50 in FIG. 9B because no correction is applied), the relative temporal variation 60 for wave 26 corrected based on wave 24, and the relative temporal variation 62 for wave 26 corrected based on wave 22.

It is observed that the relative temporal variation 60 is calculated based on equation (1). However, the relative temporal variation 62 cannot be calculated with equation (1) because the incidence angle is zero for a surface wave. Thus, another novel method, to be discussed later, is used to calculate the relative temporal variation 62.

Further, it is observed that if the depth heater is activated as shown in FIG. 9C, at hour 16, only the relative temporal variation dt/t of the wave 26 is impacted. However, if the near-surface layer is heated, all three waves are impacted as shown in FIG. 9B, at hour 4. Then, if both the depth and surface heaters are simultaneously activated, all three waves' arrival-times are affected.

The novel algorithm is capable of discriminating for wave 26 the impact of the depth heating from the impact of the surface heating by applying equation (1), as shown in FIG. 9D by curve 62.

In a practical case, another simplification may be implemented. The path of intermediate wave 24 may be similar to the path of wave 26. For example, wave 24 can be the reflection over the top of the reservoir, while wave 26 may be the reflection within the reservoir. In this case, with the notation of FIGS. 4A-D, the following approximations hold:

$$h_2 \gg h, h_2 \gg h_1 \text{ and } \theta_c \approx \theta_b.$$

With these assumptions, equation (1) becomes:

$$\left(\frac{dt_c}{t_c}\right)_{depth} = \left(\frac{dt_c}{t_c}\right) - \frac{t_b}{t_c} \cdot \left(\frac{dt_b}{t_b}\right).$$

One or more of the above-discussed embodiments may be implemented as a method, for example, in a computing device. Then, the method calculates a corrected temporal variation $(dt_1)_{depth}$ or a corrected relative temporal variation $(dt_1/t_1)_{depth}$ of a first body wave (26) based on a second body wave (24) as illustrated in FIG. 10. The method includes a step 1000 of receiving raw seismic data recorded with a receiver, wherein the raw seismic data includes recordings for the first and second body waves at various times; a step 1002 of calculating a first arrival-time variation $(dt_1)$ for the first body wave (26); a step 1004 of calculating a second arrival-time variation $(dt_2)$ for the second body wave (24); a step 1006 of calculating a first relative temporal variation $(dt_1/t_1)$ for the first body wave (26) based on the first arrival-time variation $(dt_1)$; a step 1008 of calculating a second relative temporal variation $(dt_2/t_2)$ for the second body wave (24) based on the second arrival-time variation $(dt_2)$; and a step 1010 of correcting in a computing device the first relative temporal variation $(dt_1/t_1)$ based on the second relative temporal variation $(dt_2/t_2)$ to obtain the corrected relative temporal variation $(dt_1/t_1)_{depth}$. The method may be modified to correct in the computing device the first temporal variation $(dt_1)$ based on the second temporal variation $(dt_2)$ to obtain the corrected temporal variation $(dt_1)_{depth}$. If this last step is performed, then steps 1006 and 1008 may not be needed.

Various additional steps may be envisioned as, for example, calculating a relative velocity variation (dV/V) in the subsurface based on the corrected relative temporal variation $(dt_1/t_1)_{depth}$, and monitoring changes in a target present in a substrate based on the corrected relative temporal variation $(dt_1/t_1)_{depth}$.

Next, another novel algorithm for correcting the arrival-time of a seismic wave is discussed. This novel algorithm is capable of correcting the arrival-time of a seismic wave even when equations (1) and (2) cannot be used. For example, if an incidence angle is zero, as for wave 22, equation (1) cannot work. This may be true when no body wave is available to evaluate the near-surface variations or deeper variations or when the two-layers model of FIG. 7 is not a sufficient approximation of the reality. In this case, the arrival-time correction may be made directly from any wave, including e.g., the surface wave perturbations. This approach assumes that the travel-time variations of the bottom-reflected wave 26 are proportional to the travel-time variations of any wave experiencing the near-surface perturbations, including the surface wave 22. To check this assumption, the relative temporal variations dt/t of wave 26 are plotted as a function of the relative temporal variations dt/t of wave 22, as illustrated in FIG. 11.

Figure 11:
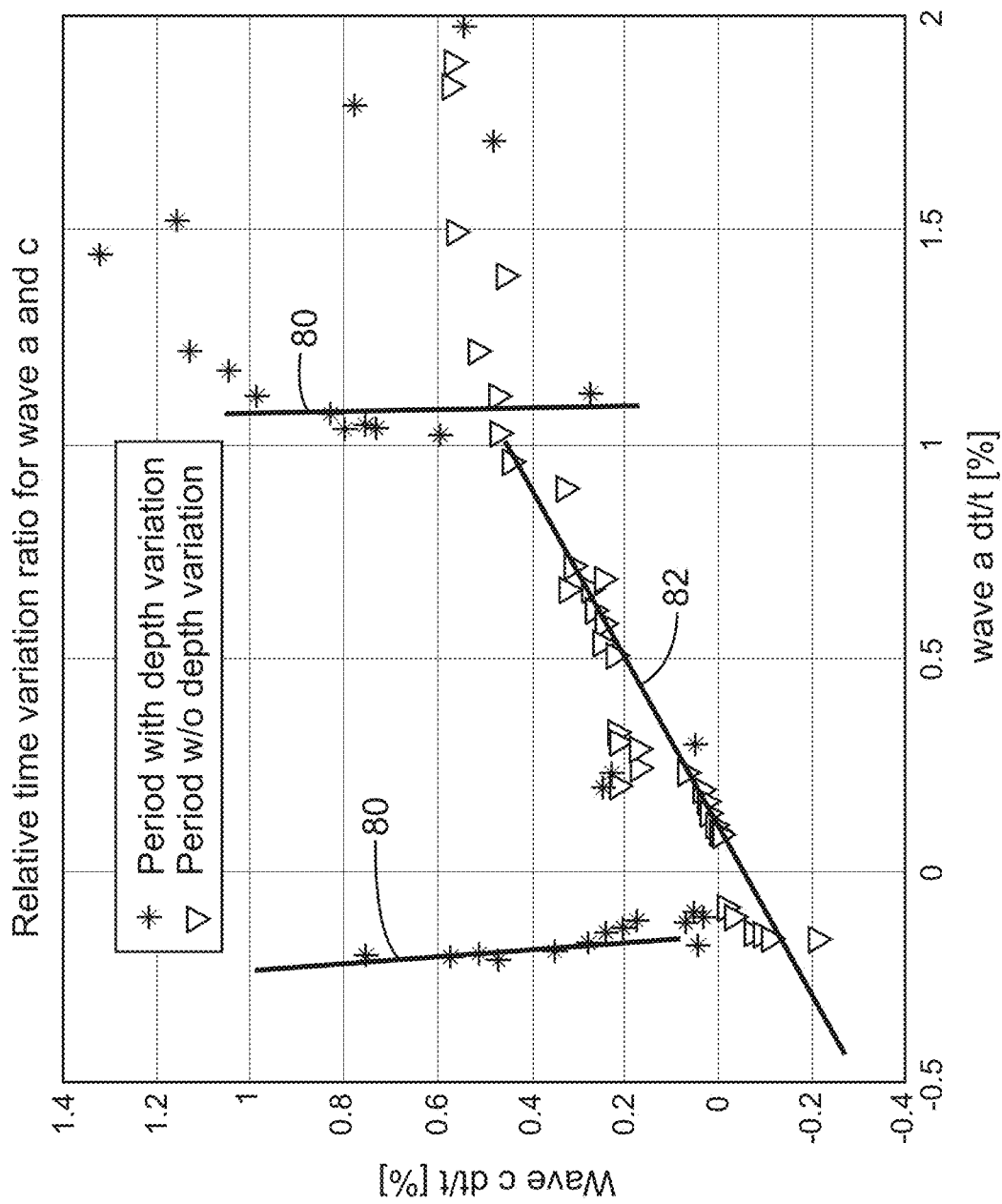
FIG. 11 is a graph illustrating relative temporal variations of a body wave versus a surface wave according to an exemplary embodiment.

The various points in FIG. 11 do not show a unique linear relation. However, the graph shows the data being distributed along several lines. For example, quasi-vertical lines 80 imply that only wave 26 is affected by time-arrival variations while wave 22 is not. This data is probably linked to variations at depth, and this data is not considered to establish a linear relation because the focus is on the near-surface variations experienced by all the waves.

Considering the line 82 passing through the origin and having a slope of about 0.5, many data points are on or about this line, which suggest that both waves 22 and 26 are affected by common relative temporal variations. For this data, only the near-surface is impacted by velocity fluctuations. The linear relationship between the relative temporal variations of waves 22 and 26 (triangles in FIG. 11) best fit a slope r that is equal to, for example, 0.4. The relative temporal variation for wave 26 corrected based on wave 22 is illustrated by curve 62 in FIG. 9D.

Curve 62 has been calculated based on a first approximation as:

$$\left(\frac{dt_c}{t_c}\right)_{depth} = \left(\frac{dt_c}{t_c}\right) - r \cdot \left(\frac{dt_a}{t_a}\right). \quad (3)$$

Applying the time correction to the bottom-reflected wave 26 measurement produces curve 62, which accurately describes the true depth relative temporal variation 58 in FIG. 9D. Thus, by computing the linear coefficient r between travel-time perturbations of the body wave versus any other wave (which can be a surface wave or a body wave), the subsurface effects can be removed from any body wave travel-times.

Comparing the body wave versus body wave (first novel algorithm, see curve 60) and the surface wave versus body wave (second novel algorithm, see curve 62) correction techniques, some differences are noticeable. These differences can be due to some imperfections in the acquisition and/or processing chain. However, it is noted that during a quiet period between hours 8 and 10 (see FIG. 9D), these imperfections are limited to 0.1% of the travel-time perturbations. Further, in the second method, the time dependency is removed as the method identifies a line in a cross-plot.

Another advantage of the second method is that it can work without array (of sources and/or receivers) beamforming if the SNR is high enough because it does not use the incidence angle value. Both novel methods are valuable for both land and marine data.

Figure 12:
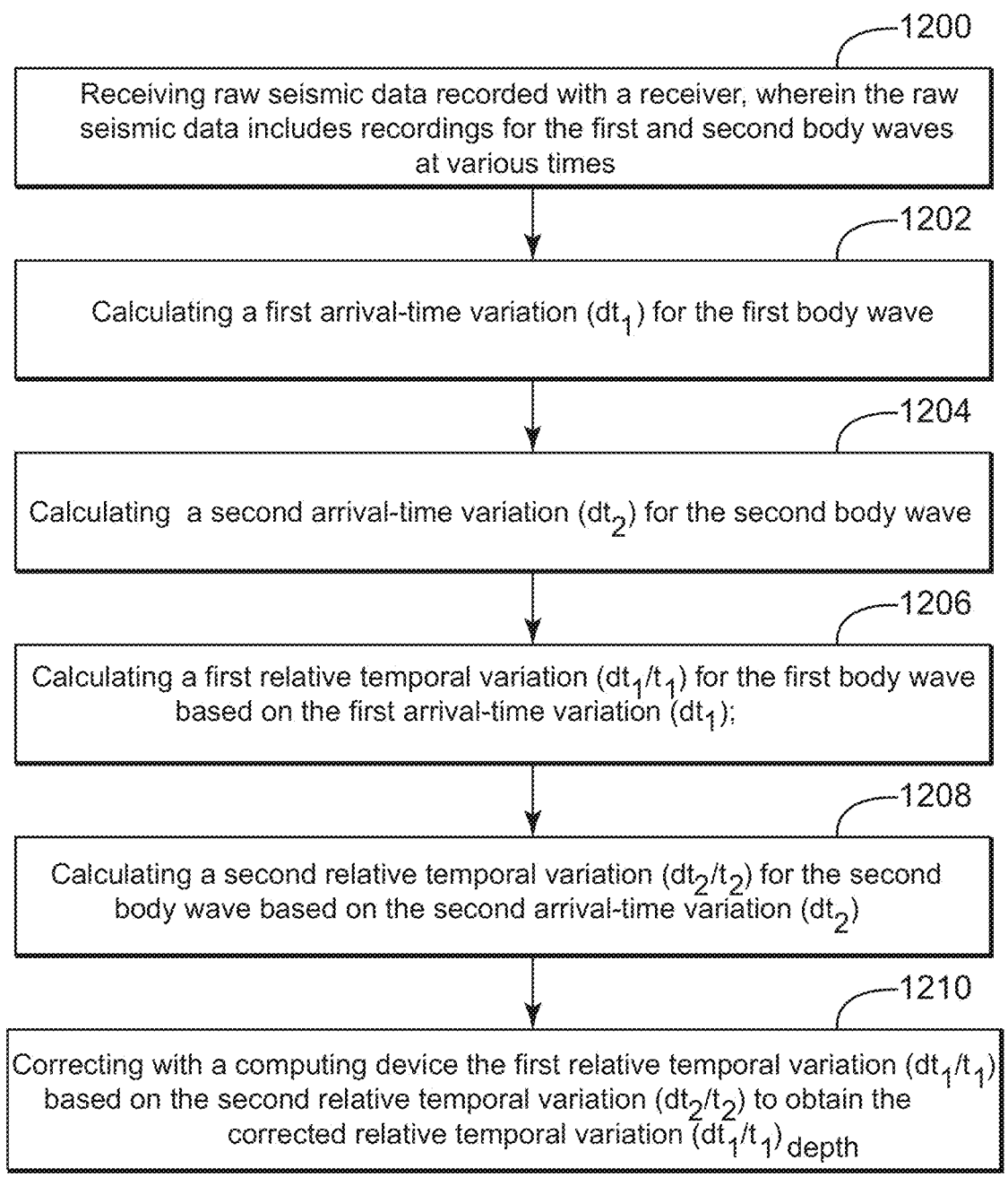
FIG. 12 is a flowchart of a method for correcting a relative temporal variation of a body wave based on a surface wave according to an exemplary embodiment.

The second novel algorithm may be implemented as a method in a computing device as discussed next. The method, as illustrated in FIG. 12, calculates a corrected relative temporal variation $(dt_1/t_1)_{depth}$ of a body wave (26) based on a surface wave (22). The method includes a step 1200 of receiving raw seismic data recorded with a receiver, wherein the raw seismic data includes recordings for the body wave and the surface wave at various times; a step 1202 of calculating a first arrival-time variation $(dt_1)$ for the body wave (26); a step 1204 of calculating a second arrival-time variation $(dt_2)$ for another wave (which can be a surface wave 22); a step 1206 of calculating a first relative temporal variation $(dt_1/t_1)$ for the body wave (26) based on the first arrival-time variation $(dt_1)$; a step 1208 of calculating a second relative temporal variation $(dt_2/t_2)$ for the another wave (22) based on the second arrival-time variation $(dt_2)$; and a step 1210 of correcting with a computing device the first relative temporal variation $(dt_1/t_1)$ based on the second relative temporal variation $(dt_2/t_2)$ to obtain the corrected relative temporal variation $(dt_1/t_1)_{depth}$. Similar to the method illustrated in FIG. 10, if the corrected temporal variation $(dt_1)_{depth}$ is intended to be determined, steps 1206 and 1208 may not be needed and step 1210 may be modified to correct with the computing device the first temporal variation $(dt_1)$ based on the second temporal variation $(dt_2)$ to obtain the corrected temporal variation $(dt_1)_{depth}$. A body wave is a wave that experiences at least one reflection before being recorded by the receiver, and a surface wave is a wave that does not experience any reflection between the source and the receiver.

Next, some enhancements to the above novel methods are discussed. When equation (1) was derived, it was asserted that an incidence angle is the same for the source and receiver sides. However, if this is not the case, a new equation can be derived to take into account this lack of symmetry. Considering waves 24 and 26 of FIG. 1, it can be shown that the arrival-time correction for depth is given by:

$$\left(\frac{dt_c}{t_c}\right)_{depth} = \left(\frac{dt_c}{t_c}\right) - \frac{t_b}{\alpha_s t_c} \cdot \frac{\cos(\theta_{b,source})}{\cos(\theta_{c,source})} \cdot \left(\frac{dt_b}{t_b}\right) - \frac{t_b}{\alpha_r t_c} \cdot \frac{\cos(\theta_{b,receiver})}{\cos(\theta_{c,receiver})} \cdot \left(\frac{dt_b}{t_b}\right), \quad (3)$$

where $\alpha_s$ and $\alpha_r$ are two coefficients that take into account the path differences at the source and receiver sides. These two coefficients are given by:

$\alpha_s = 1 + \cos(\theta_{b,source})/\cos(\theta_{b,receiver})$ and $\alpha_r = 1 + \cos(\theta_{b,receiver})/\cos(\theta_{b,source})$.

Another aspect related to the novel algorithms is related to the effect of the frequency. It is known that a wave that propagates through a medium may experience dispersion, i.e., waves of different wavelengths traveling at different phase speeds through the same medium. It is noted that the coefficient r computed using either novel algorithm may vary with the frequency. Consider the following notations: c(t) is the time-domain representation of the wavelet of interest at a given depth (wave 26 in FIG. 1), $c_0(t)$ is the time-domain reference of the wavelet of interest at the given depth, b(t) is the time-domain representation of the intermediate wavelet (wave 24 in FIG. 1), and $b_0(t)$ is the time-domain reference of the intermediate wavelet of interest.

If the beamforming method is used, c(t), $c_0(t)$, b(t), and $b_0(t)$ represent the wavelets computed using beamforming. Consider that in the frequency domain, $C(\omega)$, $C_0(\omega)$, $B(\omega)$ and $B_0(\omega)$ are the Fourier transforms of c(t), $c_0(t)$, b(t), and $b_0(t)$, respectively. The novel algorithms discussed above compute the coefficient r to link the near-surface variations of two different waves, e.g., waves 24 and 26. The arrival-time differences of waves 24 and 26 are considered to be $\theta_b$ and $\theta_c$, respectively. These arrival-time differences are computed with regard to the reference wave so that:

$$B(\omega)=e^{i\omega\theta_b} \cdot B_0(\omega) \text{ and } C(\omega)=e^{i\omega\theta_c} \cdot C_0(\omega).$$

For wave 26, if the arrival-time difference due to velocity variations at the given depth is $\delta$ and the arrival-time difference due to near-surface velocity variations is $\theta$, then:

$$C(\omega)=e^{i\omega(\theta+\delta)} \cdot C_0(\omega).$$

Using the novel algorithms, it is possible to compute r so that $\theta = r\theta_b$. Then, it can be determined that $\delta = \theta_c - r\theta_b$.

If the waves' behavior vary significantly with the frequency, it is possible to extend the novel algorithms for different frequencies by computing the coefficient r and the delay to be frequency-dependant. Because r is computed using the same process and for each frequency, it is possible to have:

$$B(\omega)=e^{i\omega\theta_b(\omega)}B_0(\omega) \text{ and } C(\omega)=e^{i\omega\theta_c(\omega)}C_0(\omega).$$

Thus, applying this expression to the arrival-time differences, it can be shown that: $\delta(\omega)=\theta_c(\omega)-r(\omega)\cdot\theta_b(\omega)$, i.e., the arrival-time differences are frequency-dependant.

Embodiments discussed above have assumed that the arrival-time differences are calculated before NMO. However, it is possible to calculate the arrival-time differences after NMO correction, as discussed next. In other words, the new method computes the travel-time coefficient after NMO or after stack (i.e., without beamforming). Using a traditional cross-equalization formalism (e.g., developed by Rickett J. and Lumley D. E., "A cross equalization processing flow for off-the-shelf 4D seismic data," 1998, 68th Ann. Internat. Mtg. SEG Expanded Abstract), a cross-equalization operator A is computed in the frequency domain so that:

$$A(\omega)s_2(\omega)-s_1(\omega)=|A(\omega)|e^{i\theta(\omega)}s_2(\omega)-s_1(\omega)\approx 0,$$

where $\theta(\omega)$ is the phase computed to compensate the near-surface velocity fluctuations at frequency $\omega$.

To take into account some imperfections (e.g., velocity model), the cross-equalization operator A can be corrected and rewritten as B according to:

$$B(\omega)=|A(\omega)|e^{ir\theta(\omega)},$$

where r can be computed according to the first or second novel algorithms illustrated in FIGS. 10 and 12. In another application, a frequency-dependant coefficient can also be used so that:

$$B(\omega)=|A(\omega)|e^{ir(\omega)\theta(\omega)}.$$

If all the cross-equalization assumptions are filled, the r coefficient should be equal to 1 and the correction is not needed.

Figure 13:
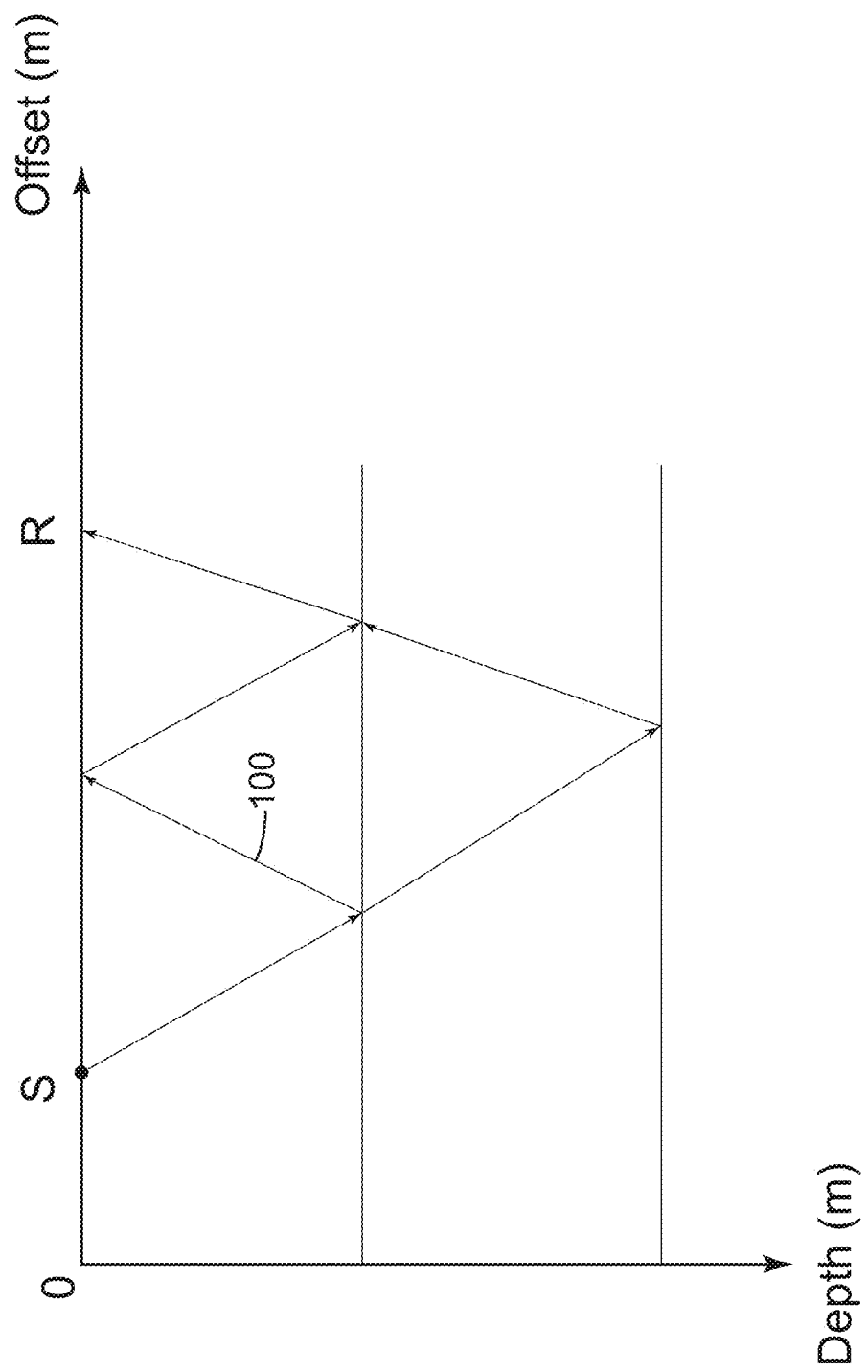
FIG. 13 is a schematic diagram illustrating multiples according to an exemplary embodiment.

According to another exemplary embodiment, the novel algorithms may be adapted to take into account multiple reflection relative temporal variations. A multiple is known as a signal that propagates back and forth between various layers of the substructure before being recorded by the receiver. An example of a multiple 100 is shown in FIG. 13. In this case, the multiple 100 may cross several times the near-surface (e.g., n times). FIG. 13 illustrates the case where n=2. Then, the relative temporal variations linked to the near-surface are multiplied by n.

In this case, equation (1) becomes:

$$\left(\frac{dt_c}{t_c}\right)_{depth} = \left(\frac{dt_c}{t_c}\right) - \left(\frac{dt_c}{t_c}\right)_{near-surface} \quad (4)$$

$$= \left(\frac{dt_c}{t_c}\right) - \frac{t_b}{nt_c} \cdot \frac{\cos(\theta_b)}{\cos(\theta_c)} \cdot \left(\frac{dt_b}{t_b}\right)$$

and this equation may be extended to the case of non-symmetrical incidence angle in a manner similar to equation (3).

Figure 14A:
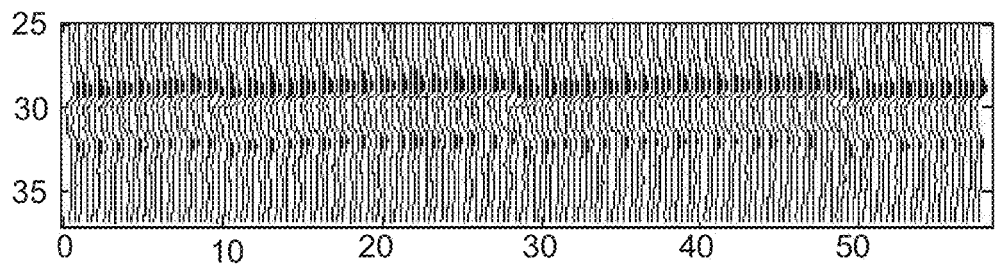
FIGS. 14A-D are graphs illustrating relative parameter variations for various parameters according to an exemplary embodiment.
Figure 14B:
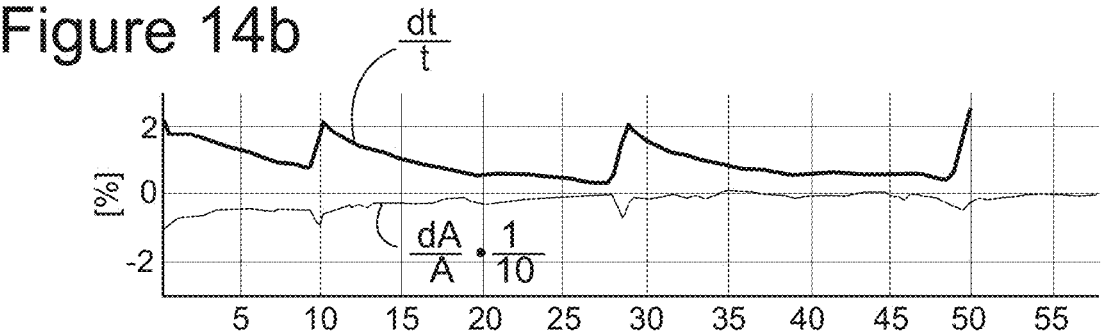
Figure 14C:
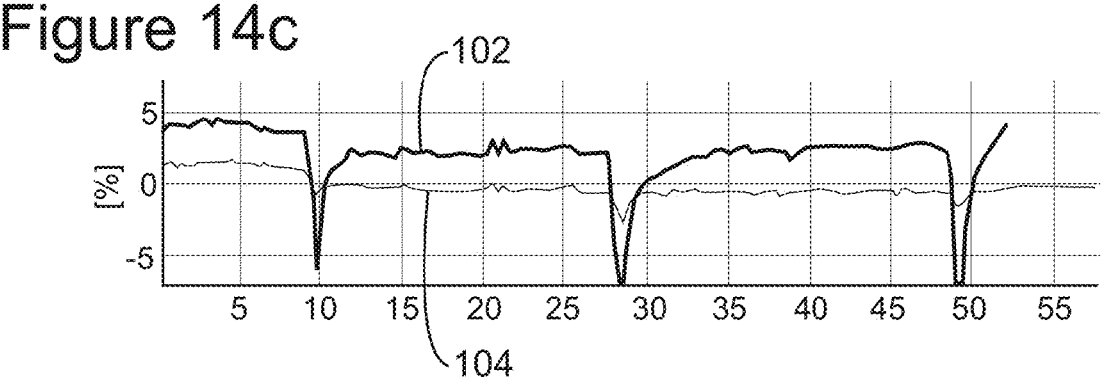
Figure 14D:
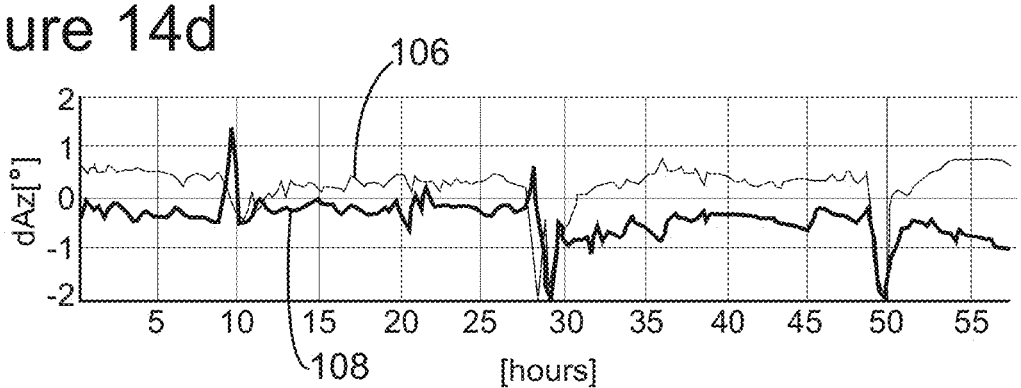

The above-discussed novel algorithms are appropriate not only for relative temporal variations but also for amplitude, source and receiver slowness (or incidence angle), source and receiver azimuth variations. It can be shown that amplitude variations, slownesses variations and azimuth variations are linked to velocity variations. This observation is supported by the experiment described in FIG. 2 in which, e.g., a surface wave reflecting at the edge of the experimental device generates the results plotted in FIG. 14A-D. FIG. 14A illustrates the recorded data (raw data), FIG. 14B illustrates the relative temporal variation dt/t and the amplitude variation divided by 10, FIG. 14C illustrates source slowness variation 102 and the receiver slowness variation 104, and FIG. 14D illustrates the receiver azimuth variation 106 and the source azimuth variation 108.

Thus, using beamforming and the novel algorithms discussed above, six parameters can be computed for each wave. These parameters can be the time-arrival, the amplitude, the source slowness (or incidence angle if the surface velocity is known), the receiver slowness (or incidence angle if the surface velocity is known), the source azimuth, and the receiver azimuth.

Further, the algorithms discussed herein for monitoring parameters with beamforming and compensating the variations due to the near-surface conditions or deeper conditions to deduce their variations at a desired depth can be extended. For example, for the slowness S, it is possible to compute another linear coefficient $r_s$ so that:

$$\left(\frac{dS_c}{S_c}\right)_{depth} = \left(\frac{dS_c}{S_c}\right) - r_s \cdot \left(\frac{dS_b}{S_b}\right) \quad (5)$$

The same equation may be used for the amplitude, source/receiver slownesses (or incidence angle), and the source/receiver azimuths. In addition, the above computations and corrections may be modified to become frequency-dependant as already discussed above.

Exemplary embodiments discussed above for computing the various wave parameters like amplitudes, slownesses, incidence angles or azimuths, etc. assumed the use of DBF technique. However, the above exemplary embodiments are not limited by DBF and other array processing techniques may be used, such as Minimum Variance Distortionless Response (MVDR), Linearly Constrained Minimum Variance (LCMV) or others.

Another variation of the above-discussed exemplary embodiments concerns the use of passive sources instead of active sources. In this context, the point-to-point traces between two receivers are built using a correlation of the two receivers record. A description of such a technique can be found in, e.g., U. Wegler and C. Sens-Schönfelder, "*Fault Zone Monitoring with Passive Image Interferometry*," Geophys. J. Int., Vol. 168, 1029-1033, 2007.

The exemplary embodiments discussed in this application show that it is possible to estimate near-surface relative temporal variations of a body wave using the variations computed based on another body wave and/or surface wave. With these novel algorithms, depth variations monitoring is made easier and finer. Extensions of these methods apply to other parameters computed with any type of beamforming techniques.

Figure 15:
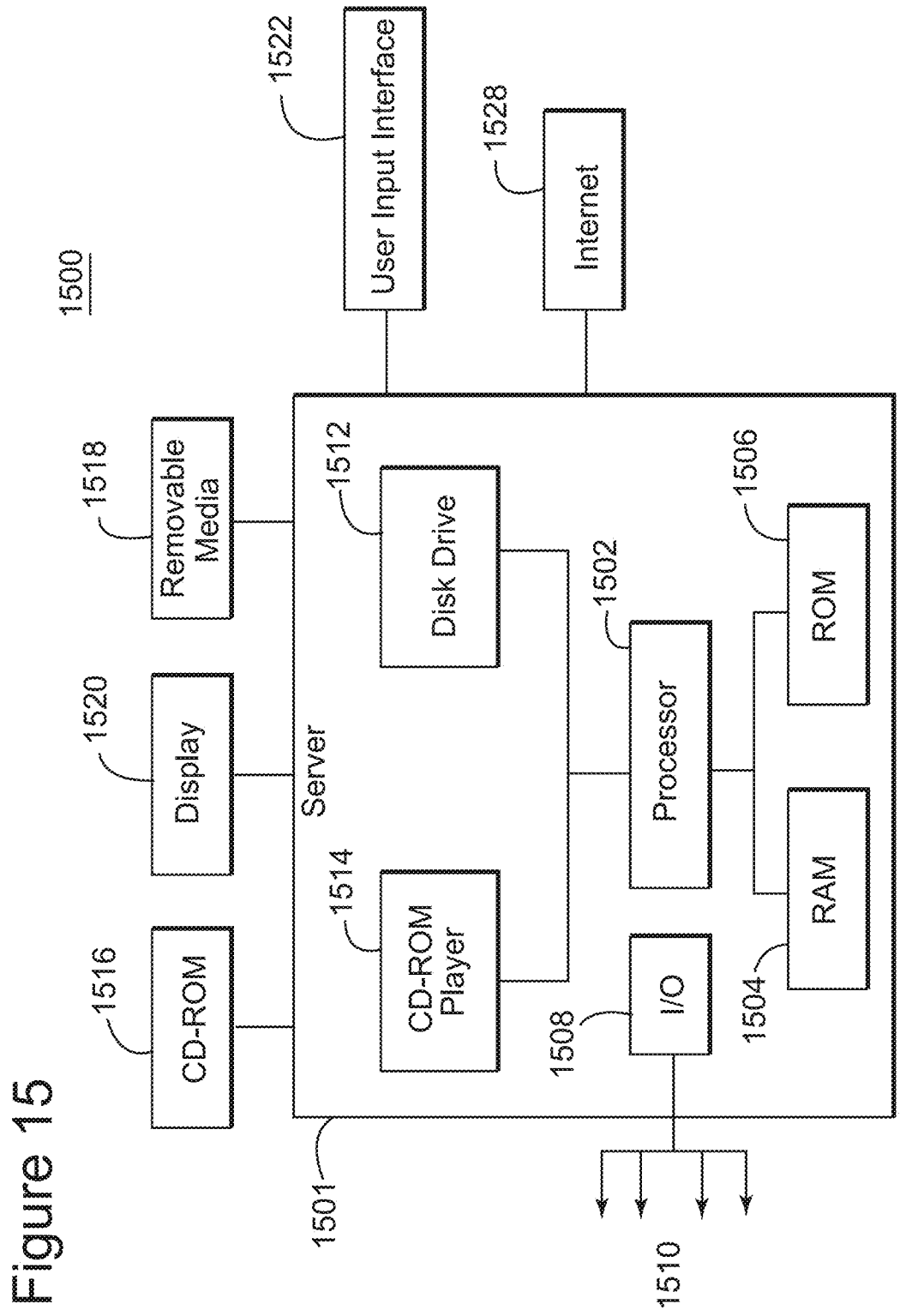
FIG. 15 is a schematic diagram of a computing device in which one or more of the exemplary embodiments may be implemented.

The novel algorithms discussed above may be implemented in a computing system. An example of a representative computing system capable of carrying out operations in accordance with the exemplary embodiments is illustrated in FIG. 15. Hardware, firmware, software or a combination thereof may be used to perform the various steps and operations described herein.

The exemplary computing system 1500 suitable for performing the activities described in the exemplary embodiments may include server 1501. Such a server 1501 may include a central processor (CPU) 1502 coupled to a random access memory (RAM) 1504 and to a read-only memory (ROM) 1506. The ROM 1506 may also be other types of storage media to store programs, such as programmable ROM (PROM), erasable PROM (EPROM), etc. The processor 1502 may communicate with other internal and external components through input/output (I/O) circuitry 1508 and bussing 1510, to provide control signals and the like. The processor 1502 carries out a variety of functions as are known in the art, as dictated by software and/or firmware instructions.

The server 1501 may also include one or more data storage devices, including hard disk drives 1512, CD-ROM and/or DVD drives 1514, and other hardware capable of reading and/or storing information such as DVD, etc. In one embodiment, software for carrying out the above-discussed steps may be stored and distributed on a CD-ROM 1516, removable media 1518 or other form of media capable of portably storing information. These storage media may be inserted into, and read by, devices such as the CD-ROM drive 1514, the disk drive 1512, etc. The server 1501 may be coupled to a display 1520, which may be any type of known display or presentation screen, such as LCD, LED displays, plasma display, cathode ray tubes (CRT), etc. A user input interface 1522 is provided, including one or more user interface mechanisms such as a mouse, keyboard, microphone, touch pad, touch screen, voice-recognition system, etc.

The server 1501 may be coupled to other computing devices, such as landline and/or wireless terminals via a network. The server may be part of a larger network configuration as in a global area network (GAN) such as the Internet 1528, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer-readable media include flash-type memories or other known memories.

The disclosed exemplary embodiments provide a system and a method for computing/estimating relative temporal variations due to changes in a predetermined underground structure. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating in a computing device a corrected temporal variation $(dt_1)_{depth}$ or a corrected relative temporal variation $(dt_1/t_1)_{depth}$ of a first body wave based on a second body wave, the method comprising:

receiving raw seismic data recorded with a receiver, wherein the raw seismic data includes recordings for the first and second body waves at various times;

calculating a first arrival-time variation $(dt_1)$ for the first body wave, wherein the first arrival-time variation $(dt_1)$ is obtained by comparing a travel-time of the first body wave recorded at a first time $(t_1)$ with a first reference travel-time associated with the first body wave;

calculating a second arrival-time variation $(dt_2)$ for the second body wave, wherein the second arrival-time variation $(dt_2)$ is obtained by comparing a travel-time of the second body wave recorded at a second time $(t_2)$ with a second reference travel-time associated with the second body wave;

calculating a first relative temporal variation $(dt_1/t_1)$ for the first body wave based on the first arrival-time variation $(dt_1)$, wherein the first relative temporal variation $(dt_1/t_1)$ is a ratio between the first arrival-time variation $(dt_1)$ and the first time $(t_1)$;

calculating a second relative temporal variation $(dt_2/t_2)$ for the second body wave based on the second arrival-time variation $(dt_2)$, wherein the second relative temporal variation $(dt_2/t_2)$ is a ratio between the second arrival-time variation $(dt_2)$ and the second time $(t_2)$ different from the first time $(t_1)$; and correcting with the computing device the first relative temporal variation $(dt_1/t_1)$ based on the second relative temporal variation $(dt_2/t_2)$ to obtain the corrected relative temporal variation $(dt_1/t_1)_{depth}$, or correcting the first arrival-time variation $(dt_1)$ based on the second arrival-time variation $(dt_2)$ to obtain the corrected temporal variation $(dt_1)_{depth}$; and monitoring changes in a target present in a substrate based on the corrected relative temporal variation $(dt_1/t_1)_{depth}$ or the corrected temporal variation $(dt_1)_{depth}$, wherein a body wave is a wave that experiences at least one reflection before being recorded by the receiver.

2. The method of claim 1, wherein the step of calculating the first arrival-time variation $(dt_1)$ for the first body wave comprises:

calculating a difference between the travel-time of the first body wave recorded at the first time $(t1)$ and the first reference travel-time of the first body wave to determine the first arrival-time variation $(dt_1)$.

3. The method of claim 1, wherein the step of calculating the second arrival-time variation $(dt_2)$ for the second body wave comprises:

calculating a difference between the travel-time of the second body wave recorded at the second time $(t2)$ and the second reference travel-time of the second body wave to determine the second arrival-time variation $(dt_2)$.

4. The method of claim 1, wherein the first body wave is reflected from a subsurface target formation and the second body wave is reflected from a subsurface formation having a lesser depth than the subsurface target formation.

5. The method of claim 1, wherein the first body wave and the second body wave experience a same velocity variation in a layer having a lesser depth than a subsurface target formation.

6. The method of claim 5, wherein the layer is a surface layer affected by environmental changes.

7. The method of claim 1, wherein the step of calculating the first relative temporal variation $(dt_1/t_1)$ for the first body wave comprises:

dividing the first arrival-time variation $(dt_1)$ by the first recording time $(t_1)$.

8. The method of claim 1, wherein the step of calculating the second relative temporal variation $(dt_2/t_2)$ for the second body wave comprises:

dividing the second arrival-time variation $(dt_2)$ by the second recording time $(t_2)$.

9. The method of claim 1, further comprising:

applying an array processing algorithm to the raw seismic data for separating recorded waves into the first and second body waves.

10. The method of claim 1, wherein the step of correcting comprises:

calculating the corrected relative temporal variation $(dt_1/t_1)_{depth}$ based on, $$\left(\frac{dt_1}{t_1}\right)_{depth} = \left(\frac{dt_1}{t_1}\right) - \frac{t_2}{t_1} \cdot \frac{\cos(\theta_2)}{\cos(\theta_1)} \cdot \left(\frac{dt_2}{t_2}\right),$$

where $\theta_1$ is an incidence angle of the first body wave, $\theta_2$ is an incidence angle of the second body wave, $t_1$ is the first recording time and $t_2$ is the second recording time.

11. The method of claim 1, wherein the step of correcting comprises:

calculating the corrected relative temporal variation $(dt_1/t_1)_{depth}$ based on, $$\left(\frac{dt_1}{t_1}\right)_{depth} = \left(\frac{dt_1}{t_1}\right) - \frac{t_2}{\alpha_s t_1} \cdot \frac{\cos(\theta_{2,source})}{\cos(\theta_{1,source})} \cdot \left(\frac{dt_2}{t_2}\right) - \frac{t_2}{\alpha_r t_1} \cdot \frac{\cos(\theta_{2,receiver})}{\cos(\theta_{1,receiver})} \cdot \left(\frac{dt_2}{t_2}\right),$$

where $\alpha_s = 1 + \cos(\theta_{2,source})/\cos(\theta_{2,receiver})$, $\alpha_r = 1 + \cos(\theta_{2,receiver})/\cos(\theta_{2,source})$, $\theta_1$ is an incidence angle of the first body wave, $\theta_2$ is an incidence angle of the second body wave, $t_1$ is the first recording time and $t_2$ is the second recording time.

12. The method of claim 1, wherein the step of correcting comprises:
calculating the corrected relative temporal variation $(dt_1/t_1)_{depth}$ based on $$\left(\frac{dt_1}{t_1}\right)_{depth} = \left(\frac{dt_1}{t_1}\right) - \frac{t_2}{nt_1} \cdot \frac{\cos(\theta_2)}{\cos(\theta_1)} \cdot \left(\frac{dt_2}{t_2}\right)$$

where $\theta_1$ is an incidence angle of the first body wave, $\theta_2$ is an incidence angle of the second body wave, n is a number of times the second body wave crosses a given layer of the subsurface, $t_1$ is the first recording time and $t_2$ is the second recording time.

13. The method of claim 1, further comprising:
calculating a relative velocity variation (dV/V) in the subsurface based on the corrected relative temporal variation $(dt_1/t_1)_{depth}$.

14. The method of claim 1, further comprising:
monitoring the changes in the target present in the substrate based on the corrected relative temporal variation $(dt_1/t_1)_{depth}$.

15. A method for calculating in a computing device a corrected parameter variation $(dp_1)_{depth}$ or a corrected relative parameter variation $(dp_1/t_1)_{depth}$ of a first body wave based on a second body wave, the method comprising:
receiving raw seismic data recorded with a receiver, wherein the raw seismic data includes recordings for the first and second body waves at various times;
applying an array processing algorithm to determine first and second relative parameter variations $(dp_1/t_1)$ and $(dp_2/t_2)$ or first and second parameter variations $(dp_1)$ and $(dp_2)$, wherein the first relative parameter variation $(dp_1/t_1)$ is a ratio between the first parameter variation $(dp_1)$ and a first recording time $(t_1)$ and the second relative parameter variation $(dp_2/t_2)$ is a ratio between the second parameter variation $(dp_2)$ and a second recording time $(t_2)$;
correcting the first relative parameter variation $(dp_1/t_1)$ based on the second relative parameter variation $(dp_2/t_2)$ to obtain the corrected relative parameter variation $(dp_1/t_1)_{depth}$, or correcting the first parameter variation $(dp_1)$ based on the second parameter variation $(dp_2)$ to obtain the corrected parameter variation $(dp_1)_{depth}$; and
monitoring changes in a target present in a substrate based on the corrected relative parameter variation $(dp_1/t_1)_{depth}$ or the corrected parameter variation $(dp_1)_{depth}$,
wherein a body wave is a wave that experiences at least one reflection before being recorded by the receiver,
wherein the first parameter variation $(dp_1)$ is obtained by comparing a first parameter of the first body wave recorded at a first time $(t_1)$ with a first reference parameter associated with the first body wave, and
wherein the second parameter variation $(dp_2)$ is obtained by comparing a first parameter of the second body wave recorded at a second time $(t_2)$ with a second reference parameter associated with the second body wave.

16. The method of claim 15, wherein the parameter p is one of a travel-time, amplitude, slowness or incidence of source, slowness or incidence of the receiver, source azimuth or receiver azimuth.

17. A computing device for calculating a corrected temporal variation $(dt_1)_{depth}$ or a corrected relative temporal variation $(dt_1/t_1)_{depth}$ of a first body wave based on a second body wave, the computing device comprising:
an interface configured to receive raw seismic data recorded with a receiver, wherein the raw seismic data includes recordings for the first and second body waves at various times; and
a processor connected to the interface and configured to,
calculate a first arrival-time variation $(dt_1)$ for the first body wave, wherein the first arrival-time variation $(dt_1)$ is obtained by comparing a travel-time of the first body wave recorded at a first time $(t_1)$ with a first reference travel-time associated with the first body wave,
calculate a second arrival-time variation $(dt_2)$ for the second body wave, wherein the second arrival-time variation $(dt_2)$ is obtained by comparing a travel-time of the second body wave recorded at a second time $(t_2)$ with a second reference travel-time associated with the second body wave,
calculate a first relative temporal variation $(dt_1/t_1)$ for the first body wave based on the first arrival-time variation $(dt_1)$, wherein the first relative temporal variation $(dt_1/t_1)$ is a ratio between the first arrival-time variation $(dt_1)$ and the first time $(t_1)$,
calculate a second relative temporal variation $(dt_2/t_2)$ for the second body wave based on the second arrival-time variation $(dt_2)$, wherein the second relative temporal variation $(dt_2/t_2)$ is a ratio between the second arrival-time variation $(dt_2)$ and the second time $(t_2)$ different from the first time $(t_1)$,
correct the first relative temporal variation $(dt_1/t_1)$ based on the second relative temporal variation $(dt_2/t_2)$ to obtain the corrected relative temporal variation $(dt_1/t_1)_{depth}$, or correct the first arrival-time variation $(dt_1)$ based on the second arrival-time variation $(dt_2)$ to obtain the corrected temporal variation $(dt_1)_{depth}$, and
monitor changes in a target present in a substrate based on the corrected relative temporal variation $(dt_1/t_1)_{depth}$ or the corrected temporal variation $(dt_1)_{depth}$,
wherein a body wave is a wave that experiences at least one reflection before being recorded by the receiver.

18. The computing device of claim 17, wherein the first body wave is reflected from a subsurface target formation and the second body wave is reflected from a subsurface formation having a lesser depth than the subsurface target formation.

19. The computing device of claim 17, wherein the first body wave and the second body wave experience a same velocity variation in a layer having a lesser depth than a subsurface target formation.

20. The computing device of claim 19, wherein the layer is a surface layer affected by environmental changes.

21. The computing device of claim 17, wherein the processor is further configured to:
apply an array processing algorithm to the raw seismic data for separating recorded waves into the first and second body waves.

22. The computing device of claim 17, wherein the processor is further configured to:

calculate the corrected relative temporal variation $(dt_1/t_1)_{depth}$ based on, $$\left(\frac{dt_1}{t_1}\right)_{depth} = \left(\frac{dt_1}{t_1}\right) - \frac{t_2}{t_1} \cdot \frac{\cos(\theta_2)}{\cos(\theta_1)} \cdot \left(\frac{dt_2}{t_2}\right),$$

where $\theta_1$ is an incidence angle of the first body wave, $\theta_2$ is an incidence angle of the second body wave, $t_1$ is the first recording time and $t_2$ is the second recording time.

23. The computing device of claim 17, wherein the processor is further configured to:

calculate the corrected relative temporal variation $(dt_1/t_1)_{depth}$ based on, $$\left(\frac{dt_1}{t_1}\right)_{depth} = \left(\frac{dt_1}{t_1}\right) - \frac{t_2}{\alpha_s t_1} \cdot \frac{\cos(\theta_{2,source})}{\cos(\theta_{1,source})} \cdot \left(\frac{dt_2}{t_2}\right) - \frac{t_2}{\alpha_r t_1} \cdot \frac{\cos(\theta_{2,receiver})}{\cos(\theta_{1,receiver})} \cdot \left(\frac{dt_2}{t_2}\right),$$

where $\alpha_s = 1 + \cos(\theta_{2,source})/\cos(\theta_{2,receiver})$, $\alpha_r = 1 + \cos(\theta_{2,receiver})/\cos(\theta_{2,source})$, $\theta_1$ is an incidence angle of the first body wave, $\theta_2$ is an incidence angle of the second body wave, $t_1$ is the first recording time and $t_2$ is the second recording time.

24. The computing device of claim 17, wherein the processor is further configured to:

calculate the corrected relative temporal variation $(dt_1/t_1)_{depth}$ based on $$\left(\frac{dt_1}{t_1}\right)_{depth} = \left(\frac{dt_1}{t_1}\right) - \frac{t_2}{nt_1} \cdot \frac{\cos(\theta_2)}{\cos(\theta_1)} \cdot \left(\frac{dt_2}{t_2}\right)$$

where $\theta_1$ is an incidence angle of the first body wave, $\theta_2$ is an incidence angle of the second body wave, n is a number of times the second body wave crosses a given layer of the subsurface, $t_1$ is the first recording time and $t_2$ is the second recording time.

25. A non-transitory computer-readable storing medium including computer executable instructions, wherein the instructions, when executed by a processor, implement instructions for calculating a corrected temporal variation $(dt_1)_{depth}$ or a corrected relative temporal variation $(dt_1/t_1)_{depth}$ of a first body wave based on a second body wave, the instructions comprising:

receiving raw seismic data recorded with a receiver, wherein the raw seismic data includes recordings for the first and second body waves at various times;

calculating a first arrival-time variation $(dt_1)$ for the first body wave, wherein the first arrival-time variation $(dt_1)$ is obtained by comparing a travel-time of the first body wave recorded at a first time $(t_1)$ with a first reference travel-time associated with the first body wave;

calculating a second arrival-time variation $(dt_2)$ for the second body wave, wherein the second arrival-time variation $(dt_2)$ is obtained by comparing a travel-time of the second body wave recorded at a second time $(t_2)$ with a second reference travel-time associated with the second body wave;

calculating a first relative temporal variation $(dt_1/t_1)$ for the first body wave based on the first arrival-time variation $(dt_1)$, wherein the first relative temporal variation $(dt_1/t_1)$ is a ratio between the first arrival-time variation $(dt_1)$ and the first time $(t_1)$;

calculating a second relative temporal variation $(dt_2/t_2)$ for the second body wave based on the second arrival-time variation $(dt_2)$, wherein the second relative temporal variation $(dt_2/t_2)$ is a ratio between the second arrival-time variation $(dt_2)$ and the second time $(t_2)$ different from the first time (t1);

correcting in a computing device the first relative temporal variation $(dt_1/t_1)$ based on the second relative temporal variation $(dt_2/t_2)$ to obtain the corrected relative temporal variation $(dt_1/t_1)_{depth}$, or correcting the first arrival-time variation $(dt_1)$ based on the second arrival-time variation $(dt_2)$ to obtain the corrected temporal variation $(dt_1)_{depth}$, and monitoring changes in a target present in a substrate based on the corrected relative temporal variation $(dt_1/t_1)_{depth}$ or the corrected temporal variation $(dt_1)_{depth}$, wherein a body wave is a wave that experiences at least one reflection before being recorded by the receiver.

* * * * *